(12) United States Patent
Fushimi et al.

(10) Patent No.: US 10,408,367 B2
(45) Date of Patent: Sep. 10, 2019

(54) MESH-PATTERNED RESIN MOLDED PRODUCT

(71) Applicants: TOKYO PRINTING INK MFG. CO., LTD., Tokyo (JP); SUMITOMO RIKO Company Limited, Aichi (JP)

(72) Inventors: Atsushi Fushimi, Saitama (JP); Yuji Tomizawa, Saitama (JP); Koki Ikeda, Saitama (JP); Hiroyoshi Mori, Komaki (JP); Tokunori Kobayashi, Komaki (JP)

(73) Assignees: TOKYO PRINTING INK MFG. CO., LTD., Tokyo (JP); SUMITOMO RIKO Company Limited, Aichi (JP)

( * ) Notice: Subject to any disclaimer, the term of this patent is extended or adjusted under 35 U.S.C. 154(b) by 155 days.

(21) Appl. No.: 15/541,977

(22) PCT Filed: Feb. 4, 2016

(86) PCT No.: PCT/JP2016/053319
§ 371 (c)(1),
(2) Date: Jul. 6, 2017

(87) PCT Pub. No.: WO2016/132916
PCT Pub. Date: Aug. 25, 2016

(65) Prior Publication Data
US 2017/0356572 A1 Dec. 14, 2017

(30) Foreign Application Priority Data
Feb. 19, 2015 (JP) .................................. 2015-031021

(51) Int. Cl.
*F16L 11/00* (2006.01)
*F16L 11/08* (2006.01)
(Continued)

(52) U.S. Cl.
CPC ........ *F16L 11/082* (2013.01); *B29C 48/0018* (2019.02); *B29C 48/10* (2019.02);
(Continued)

(58) Field of Classification Search
CPC ...... F16L 57/06; B29C 47/0033; B29C 47/24; B29D 28/00
(Continued)

(56) References Cited

U.S. PATENT DOCUMENTS 3,193,604 A 7/1965 Mercer
2010/0323138 A1* 12/2010 Yoshioka ................. D02G 3/06
428/36.1

(Continued)

FOREIGN PATENT DOCUMENTS

EP 2362507 A1 8/2011
FR 2928199 A1 9/2009
(Continued)

OTHER PUBLICATIONS

International Search Report dated Mar. 8, 20216 filed in PCT/JP2016/053319.
(Continued)

*Primary Examiner* — Patrick F Brinson
(74) *Attorney, Agent, or Firm* — Rankin, Hill & Clark LLP

(57) ABSTRACT

Provided is a mesh-patterned resin molded product (10) used for encasing and protecting a hollow piping member provided in a vehicle or a small ship. The mesh-patterned resin molded product (10), in a case of an ordinary state where no load is applied to the mesh-patterned resin molded product (10), includes a plurality of first resin wired portions (11) that extend parallel to each other, and a plurality of second resin wired portions (12) that extend parallel to each other in a direction respectively intersecting the first resin wired
(Continued)

portions (11). Each of the first resin wired portions (11) and each of the second resin wired portions (12) are joined to each other on a joint portion (13) positioned at a mutual intersection portion. At the intersection portion, a direction passing through both axial centers of the first resin wired portion (11) and the second resin wired portion (12) and being orthogonal to both the axial centers is set as an orthographic projection direction P. When the first resin wired portion (11) and the second resin wired portion (12) are viewed in the orthographic projection direction P, a second surface area that is a surface area of the joint portion (13) between the first resin wired portion (11) and the second resin wired portion (12) is smaller than a first surface area that is an overlapping surface area between the first resin wired portion (11) and the second resin wired portion (12). The plurality of first resin wired portions (11) and the plurality of second resin wired portions (12) are formed of a material including a thermoplastic resin.

14 Claims, 13 Drawing Sheets

(51) Int. Cl.

| | | |
|---|---|---|
| *B29C 48/10* | (2019.01) | |
| *B29C 48/00* | (2019.01) | |
| *B29C 48/78* | (2019.01) | |
| *B32B 1/08* | (2006.01) | |
| *B32B 5/02* | (2006.01) | |
| *B29C 55/22* | (2006.01) | |
| *B29C 55/24* | (2006.01) | |
| *B29D 23/00* | (2006.01) | |
| *B29D 28/00* | (2006.01) | |
| *F16L 11/10* | (2006.01) | |
| *B29C 48/30* | (2019.01) | |
| *B29C 48/16* | (2019.01) | |
| *B29C 48/345* | (2019.01) | |
| *B29K 23/00* | (2006.01) | |
| *B29K 67/00* | (2006.01) | |
| *B29K 101/12* | (2006.01) | |
| *B29L 23/00* | (2006.01) | |
| *B29L 28/00* | (2006.01) | |

(52) U.S. Cl.
CPC ............ *B29C 48/16* (2019.02); *B29C 48/30* (2019.02); *B29C 48/301* (2019.02); *B29C 48/345* (2019.02); *B29C 48/78* (2019.02); *B29C 55/22* (2013.01); *B29C 55/24* (2013.01); *B29D 23/00* (2013.01); *B29D 28/00* (2013.01); *B32B 1/08* (2013.01); *B32B 5/028* (2013.01); *F16L 11/10* (2013.01); *B29C 2793/009* (2013.01); *B29C 2793/0063* (2013.01); *B29K 2023/06* (2013.01); *B29K 2023/12* (2013.01); *B29K 2067/003* (2013.01); *B29K 2101/12* (2013.01); *B29L 2023/00* (2013.01); *B29L 2028/00* (2013.01)

(58) Field of Classification Search
USPC ................. 138/110, 123–125; 428/36.1, 220
See application file for complete search history.

(56) References Cited

U.S. PATENT DOCUMENTS

| | | | |
|---|---|---|---|
| 2011/0236614 A1 | 9/2011 | Ushikai | |
| 2012/0238172 A1* | 9/2012 | Siebert | B32B 5/022 |
| | | | 442/334 |

FOREIGN PATENT DOCUMENTS

| | | |
|---|---|---|
| JP | 34004185 | 5/1959 |
| JP | 62007429 | 1/1987 |
| JP | H0511720 U | 2/1993 |
| JP | 09286052 | 11/1997 |
| JP | 2000117865 A2 | 4/2000 |
| JP | 2001099389 A | 4/2001 |
| JP | 2002154147 A2 | 5/2002 |
| JP | 2002181258 A2 | 6/2002 |
| JP | 2002527684 | 8/2002 |
| JP | 2005006560 A | 1/2005 |
| JP | 2008223940 A2 | 9/2008 |
| JP | 2011224802 A | 11/2011 |
| JP | 2012228145 A | 11/2012 |
| WO | 00022216 | 4/2000 |

OTHER PUBLICATIONS

Extended Search Report dated Aug. 22, 2018 for the corresponding European Patent Application No. 16752303.4.
Office Action dated Aug. 15, 2018 for the corresponding Chinese Patent Application No. 201680004752.2.

* cited by examiner (a)

(b)

(c)

(a)

(b)

(c)

(a)

(b)

(c)

(a)

(b)

(c)

(a)

(b)

(a)

(b)

(c)

(a)

(b)

(c)

FIG. 14
| | | WHEN STRETCHED | WHEN IN ORDINARY TIME | WHEN SQUEEZED | STRETCHING RATE |
|---|---|---|---|---|---|
| EXAMPLE 1 | LENGTH | 520 | 481 | 130 | 4.00 |
| | OUTER DIAMETER | 11 | 16.5 | 31.5 | 2.86 |
| EXAMPLE 2 | LENGTH | 413 | 270 | 40 | 10.33 |
| | FOLDED WIDTH | 8 | 38 | 52 | 6.50 |
UNIT : mm
FIG. 15
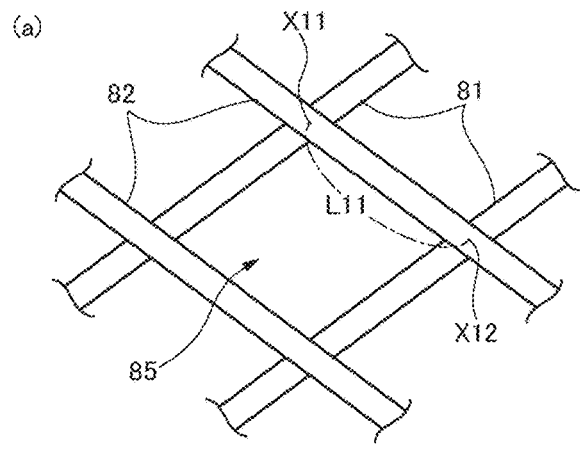
(a)
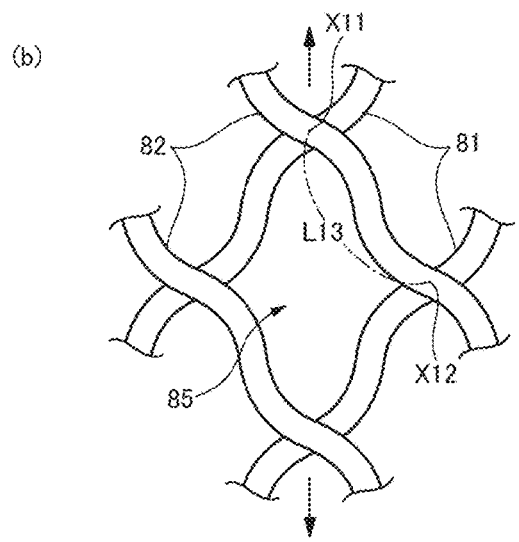
(b)

MESH-PATTERNED RESIN MOLDED PRODUCT

TECHNICAL FIELD

The present invention relates to a mesh-patterned resin molded product.

BACKGROUND ART

For example, Patent Documents 1 to 3 disclose a mesh-patterned resin molded product such as a mesh-patterned resin tube, and a method of manufacturing the same.

In these documents, Patent Document 1 discloses a mesh-patterned resin tube having a structure excellent in bendability.

RELATED DOCUMENT

Patent Document

[Patent Document 1] Japanese Unexamined Patent Publication No. 2002-181258
[Patent Document 2] Japanese Unexamined Patent Publication No. 2002-154147
[Patent Document 3] Japanese Unexamined Patent Publication No. 9-286052
[Patent Document 4] Japanese Unexamined Patent Publication No. 2008-223940
[Patent Document 5] PCT Japanese Translation Patent Publication No. 2002-527684

SUMMARY OF THE INVENTION

Technical Problem

According to the knowledge of the inventors and the like, in the related art, stretchability of mesh-patterned resin molded products including the mesh-patterned resin molded product disclosed in Patent Document 1 has not been sufficient. That is, the mesh-patterned resin tube disclosed in Patent Document 1 may have a certain degree of bendability. However, the stretchability in an axial direction is not sufficient.

In addition, in a case where the mesh-patterned resin molded product in the related art is used for a purpose similar to those of the technologies disclosed in Patent Documents 4 and 5, that is, for a purpose of protecting bent hydraulic piping (rubber hose) mounted in an automobile or the like, there is room for improving the stretchability of the mesh-patterned resin molded product, from the viewpoint of fitting (being in tight contact) so as to trace a protection subject. In addition, regarding mesh-patterned resin molded products in the related art, there is room for improvement in regard to a fray which is likely to be caused at an end portion thereof when the mesh-patterned resin molded product itself is partially cut.

Solution to Problem

According to the present invention, there is provided a mesh-patterned resin molded product used for encasing and protecting a hollow piping member provided in a vehicle or a small ship. The mesh-patterned resin molded product in a case of an ordinary state where no load is applied to the mesh-patterned resin molded product includes a plurality of first resin wired portions that extend parallel to each other, and a plurality of second resin wired portions that extend parallel to each other in a direction respectively intersecting the first resin wired portions. Each of the first resin wired portions and each of the second resin wired portions are joined to each other on a joint portion positioned at a mutual intersection portion. In a case where a direction passing through both axial centers of the first resin wired portion and the second resin wired portion and being orthogonal to both the axial centers is set as an orthographic projection direction at the intersection portion between the first resin wired portion and the second resin wired portion which are joined to each other, when the first resin wired portion and the second resin wired portion are viewed in the orthographic projection direction, a second surface area that is a surface area of the joint portion between the first resin wired portion and the second resin wired portion is smaller than a first surface area that is an overlapping surface area between the first resin wired portion and the second resin wired portion. The plurality of first resin wired portions and the plurality of second resin wired portions are formed of a material including a thermoplastic resin.

According to the mesh-patterned resin molded product of the present invention, it is possible to protect the hollow piping provided in a vehicle or a small ship. Here, the above-described vehicle may be two wheels, three wheels, four wheels, or more as long as the vehicle has an internal combustion engine. Examples of the above-described vehicle include construction vehicles, agricultural vehicles, and industrial vehicles, in addition to vehicles regulated by the road traffic law, that is, automobiles such as various types of automobiles having an internal combustion engine, electric automobiles, fuel cell automobiles, and hybrid vehicles; motorized bicycles; light vehicles; and trolley buses. In addition, the above-described small ship indicates ships of which the gross tonnage is less than 20 tons. Examples of the above-described small ship include a pleasure boat, a motor boat, a hovercraft, a yacht with an engine, and a personal water craft (marine jet).

Advantageous Effects of Invention

According to the present invention, the mesh-patterned resin molded product can have excellent stretchability.

BRIEF DESCRIPTION OF THE DRAWINGS

The above-described object, other objects, features, and advantages become clearer through preferable embodiments described below and the following accompanying drawings.

FIG. 1(a) is a front view, FIG. 1(b) is a sectional view taken along line A-A in FIG. 1(a), and FIG. 1(c) is a plan view of a portion in the vicinity of an intersection portion between a first resin wired portion and a second resin wired portion.

FIG. 3(a) shows an ordinary state where no external force is applied to the mesh-patterned resin molded product, FIG. 3(b) shows a state where the mesh-patterned resin molded product is stretched, and FIG. 3(c) shows a state where the mesh-patterned resin molded product is squeezed.

FIG. 4(a) shows the ordinary state where no external force is applied to the mesh-patterned resin molded product, FIG. 4(b) shows a state where the mesh-patterned resin molded product is stretched, and FIG. 4(c) shows a state where the mesh-patterned resin molded product is squeezed.

FIG. 5(a) shows a state where the mesh-patterned resin molded product is bent, FIG. 5(b) shows a state where a piping member is inserted into the mesh-patterned resin molded product and the mesh-patterned resin molded product is stretched, and FIG. 5(c) shows a cross-sectional view of the state where the piping member is inserted into the mesh-patterned resin molded product and the mesh-patterned resin molded product is stretched.

FIG. 7(a) is a planar cross-sectional view, and FIGS. 7(b) and 7(c) are partially enlarged planar cross-sectional views.

FIG. 10(a) shows an ordinary state where no external force is applied to the mesh-patterned resin molded product, FIG. 10(b) shows a state where the mesh-patterned resin molded product is stretched in a first direction, and FIG. 10(c) shows a state where the mesh-patterned resin molded product is stretched in a second direction which is orthogonal to the first direction.

FIG. 11(a) shows a state before a step of improving the mobility of the joint portion is performed, and FIGS. 11(b) and 11(c) show states after the step.

FIG. 12(a) shows an ordinary state where no external force is applied to the mesh-patterned resin molded product, FIG. 12(b) shows a state where the mesh-patterned resin molded product is stretched in an axial direction, and FIG. 12(c) shows a state where the mesh-patterned resin molded product is squeezed in the axial direction.

FIG. 13(a) shows an ordinary state where no external force is applied to the mesh-patterned resin molded product, FIG. 13(b) shows a state where the mesh-patterned resin molded product is stretched in the axial direction, and FIG. 13(c) shows a state where the mesh-patterned resin molded product is squeezed in the axial direction.

FIG. 14 is a view showing stretching rates and the like of the mesh-patterned resin molded products according to Examples 1 and 2.

FIG. 15 is a view for describing an operation of a mesh-patterned resin molded product according to a comparative embodiment. In the view, FIG. 15(a) shows an ordinary state where no external force is applied to the mesh-patterned resin molded product, and FIG. 15(b) shows a state where the mesh-patterned resin molded product is stretched.

DESCRIPTION OF EMBODIMENTS

Hereinafter, embodiments of the present invention will be described by using drawings. In all of the drawings, the same reference signs will be applied to similar configuration elements, and the description will not be repeated.

First Embodiment

Figure 1:
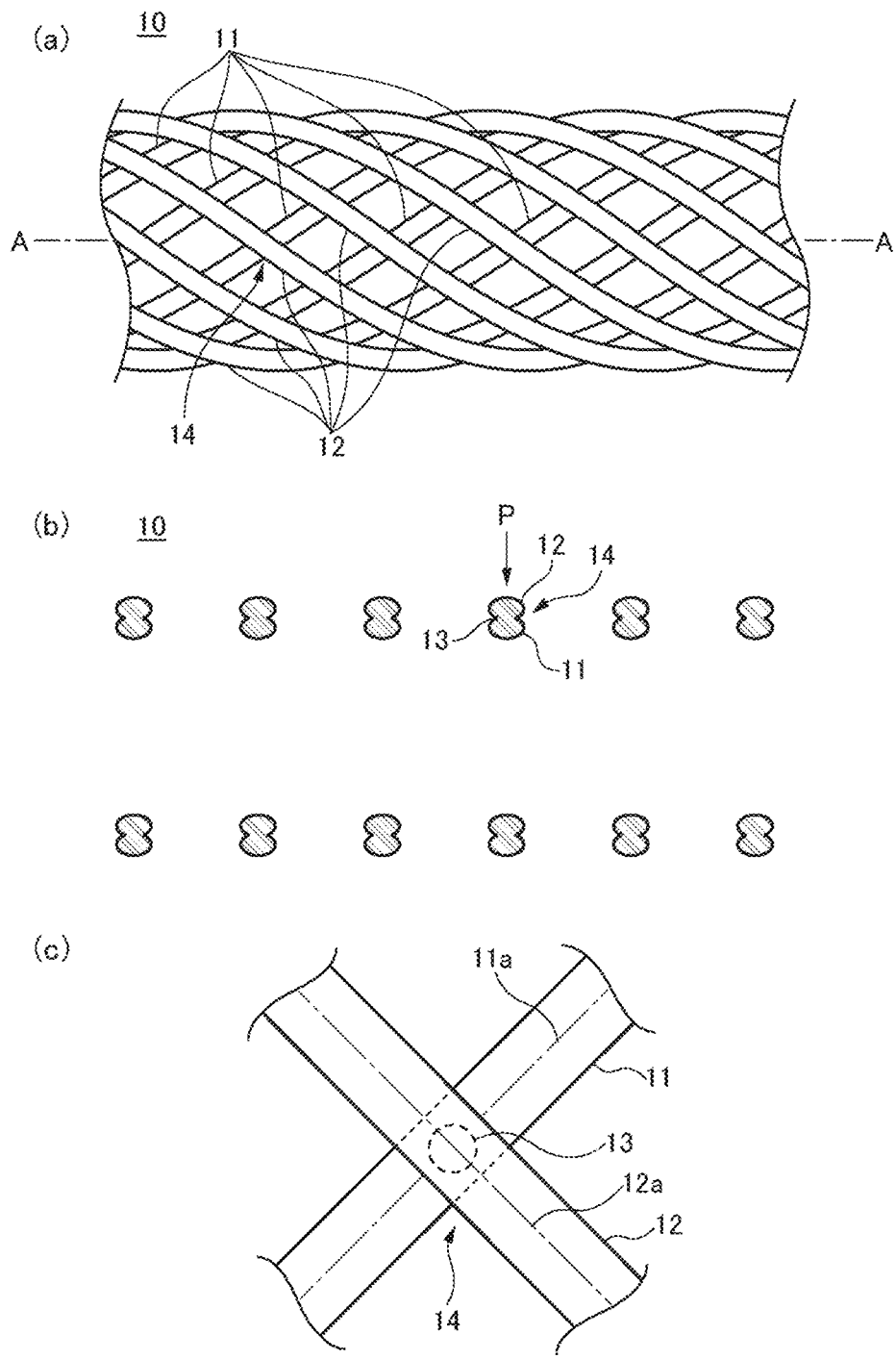
FIG. 1 is a view showing a mesh-patterned resin molded product according to a first embodiment. In the view.

FIG. 1 is a view showing a mesh-patterned resin molded product 10 according to a first embodiment. In the view, FIG. 1(a) is a front view, FIG. 1(b) is a sectional view taken along line A-A in FIG. 1(a), and FIG. 1(c) is a plan view of a portion in the vicinity of an intersection portion 14 between a first resin wired portion 11 and a second resin wired portion 12.

Figure 2:
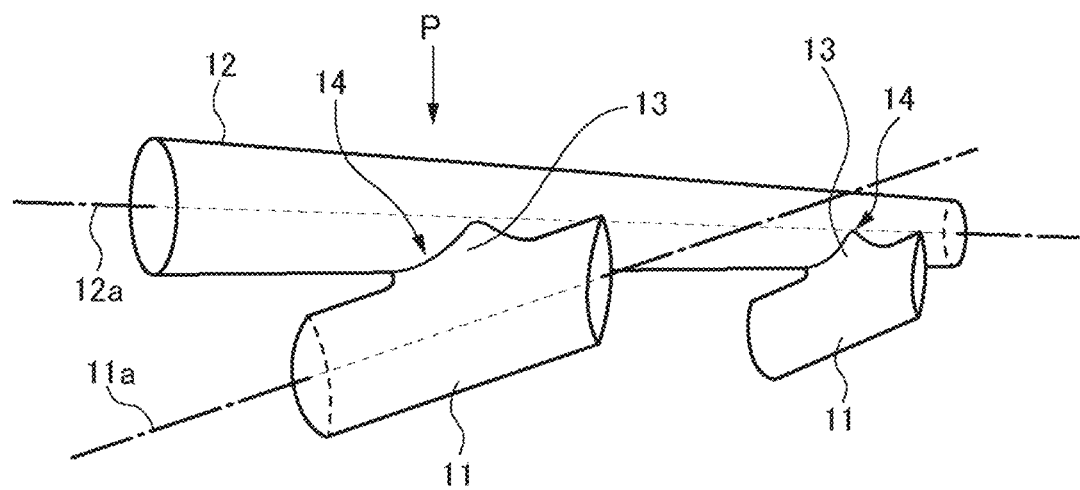
FIG. 2 is a perspective view showing a portion in the vicinity of the intersection portion between the first resin wired portion and the second resin wired portion of the mesh-patterned resin molded product according to the first embodiment.

FIG. 2 is a perspective view showing a portion in the vicinity of the intersection portion 14 between the first resin wired portion 11 and the second resin wired portion 12 of the mesh-patterned resin molded product 10 according to the first embodiment.

Figure 3:
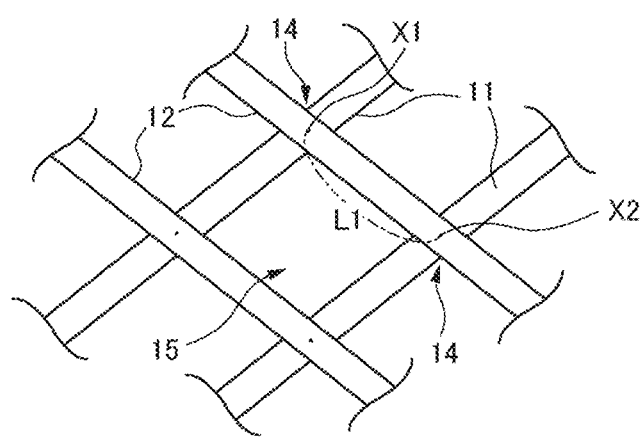
FIG. 3 is a plan view for describing an operation of a mesh of the mesh-patterned resin molded product according to the first embodiment. In the view.
Figure 3:
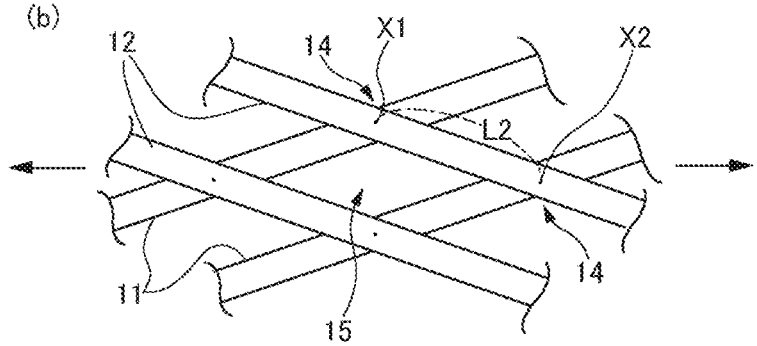
Figure 3:
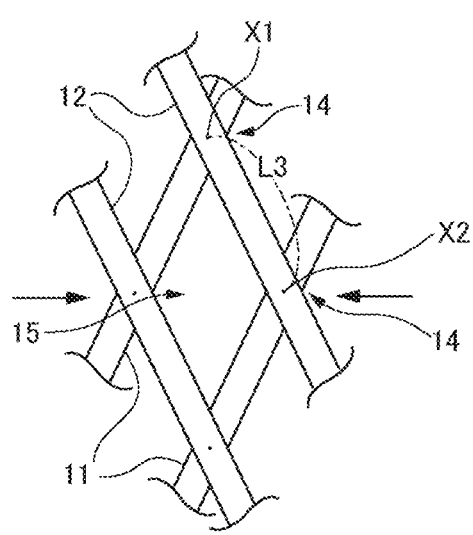

FIG. 3 is a plan view for describing an operation of a mesh 15 of the mesh-patterned resin molded product 10 according to the first embodiment. In the view, FIG. 3(a) shows an ordinary state where no external force is applied to the mesh-patterned resin molded product 10, FIG. 3(b) shows a state where the mesh-patterned resin molded product 10 is stretched, and FIG. 3(c) shows a state where the mesh-patterned resin molded product 10 is squeezed.

Figure 4:
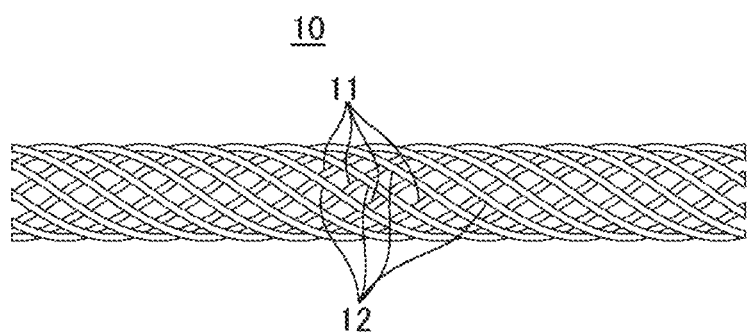
FIG. 4 is a front view for describing an operation of the mesh-patterned resin molded product according to the first embodiment. In the view.
Figure 4:
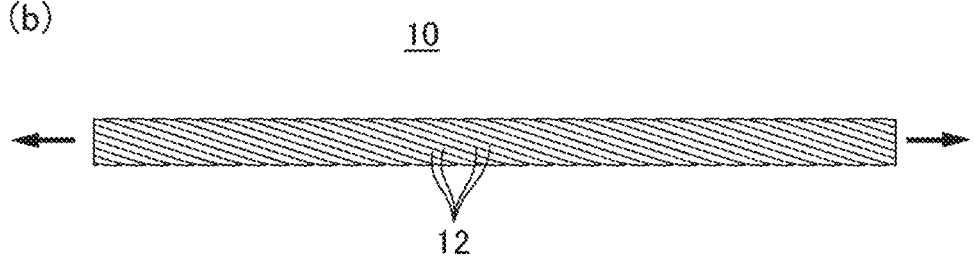
Figure 4:
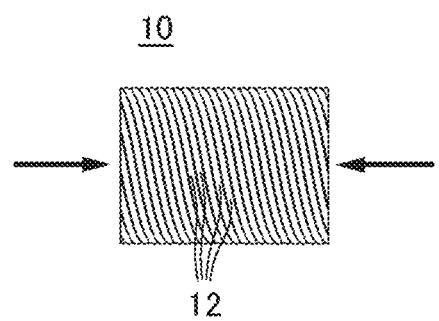
Figure 5:
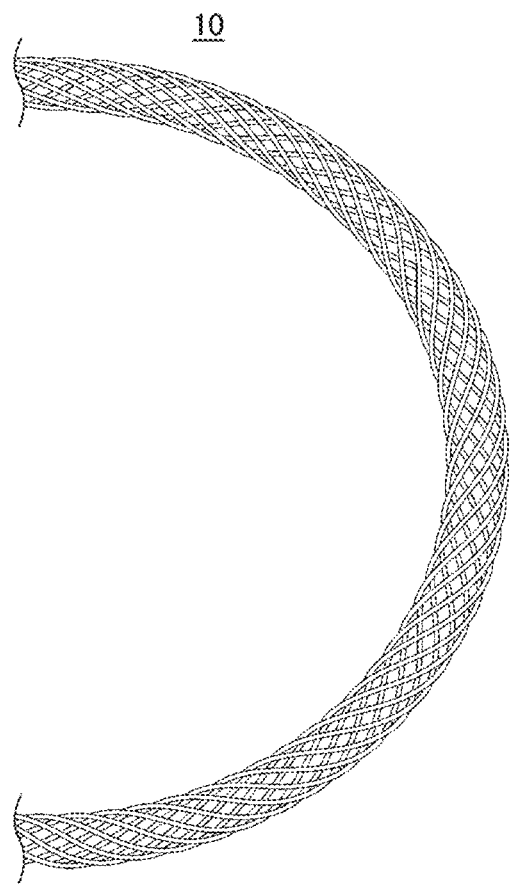
FIG. 5 is a front view for describing another operation of the mesh-patterned resin molded product according to the first embodiment. In the view.
Figure 5:
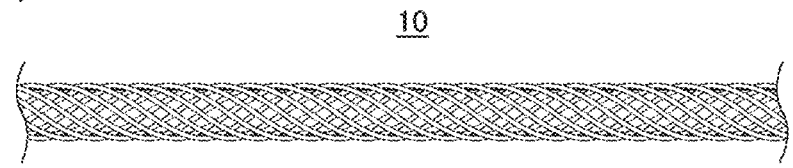
Figure 5:
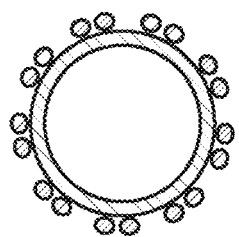

Each view of FIGS. 4 and 5 is a front view for describing operations of the mesh-patterned resin molded product 10 according to the first embodiment. In the views, FIG. 4(a) shows the ordinary state where no external force is applied to the mesh-patterned resin molded product 10. FIG. 4(b) shows a state where the mesh-patterned resin molded product 10 is stretched. FIG. 4(c) shows a state where the mesh-patterned resin molded product 10 is squeezed. FIG. 5(a) shows a state where the mesh-patterned resin molded product 10 is bent. FIG. 5(b) shows a state where a piping member 16 is inserted into the mesh-patterned resin molded product 10 and the mesh-patterned resin molded product is stretched.

In a case where the mesh-patterned resin molded product in the related art described above in the section of BACKGROUND ART is used for a purpose similar to those of the technologies disclosed in Patent Documents 4 and 5, that is, for a purpose of protecting the hydraulic piping (rubber hose) mounted in an automobile or the like, there is room for improving the stretchability of the mesh-patterned resin molded product, from the viewpoint of fitting (being in tight contact) so as to trace a protection subject. Specifically, in a case of postulating that the mesh-patterned resin molded product in the related art is used to protect the hydraulic piping (rubber hose) mounted in an automobile or the like, there is room for improvement from the viewpoint of a balance between the bendability and the stretchability. Furthermore, in the mesh-patterned resin molded product in the related art, there is room for improvement from the viewpoint of temperature durability. In addition, since the mesh-patterned resin molded product in the related art is formed of textile fabrics, there is room for improvement in regard to a fray which is likely to be caused at an end portion thereof when the mesh-patterned resin molded product itself is partially cut.

The mesh-patterned resin molded product 10 according to the present embodiment is used for encasing and protecting a hollow piping member provided in a vehicle or a small ship. So to speak, the mesh-patterned resin molded product 10 according to the present embodiment is a member which protects the hollow piping provided in a vehicle or a small ship. Here, the above-described vehicle may have two wheels, three wheels, four wheels, or more as long as the vehicle has an internal combustion engine. Specific examples of the vehicle include construction vehicles, agricultural vehicles, and industrial vehicles, in addition to the vehicles regulated by the road traffic law, that is, automobiles such as various types of automobiles having an internal combustion engine, electric automobiles, fuel cell automobiles, and hybrid vehicles; motorized bicycles; light vehicles; and trolley buses. In addition, the small ship indicates ships of which the gross tonnage is less than 20 tons. Examples of the above-described small ship include a pleasure boat, a motor boat, a hovercraft, a yacht with an engine, and a personal water craft (marine jet).

Among these, from the viewpoint of handleability, it is preferable that the mesh-patterned resin molded product 10 according to the present embodiment is used for encasing and protecting a hollow piping member provided in an automobile having an internal combustion engine. In this case, since the mesh-patterned resin molded product 10 is placed under a high-temperature condition when in use, the mesh-patterned resin molded product 10 is required to be formed by using an excellent resin material, from the viewpoint of temperature durability (heat resistance), that is, a heat-resistant resin material. In addition, in a case where the mesh-patterned resin molded product 10 is used for encasing and protecting a hollow piping member provided in an automobile having an internal combustion engine, the mesh-patterned resin molded product 10 is required to have characteristics such as heat resistance, flame retardance, fuel resistance, and weather resistance. In order to form the mesh-patterned resin molded product 10 satisfying the above-described characteristics, it is important to control the compound composition of the resin material forming the mesh-patterned resin molded product 10.

Here, specific examples of the hollow piping member provided in a vehicle include a fuel feeding pipe, a fuel return pipe, hydraulic piping, a brake tube, a fuel tube, a power steering tube, and a piping tube related to a function (for example, air conditioner) independent from an operation system of a vehicle. In other words, it is possible to mention that the hollow piping member according to the present embodiment is a member which is provided in a vehicle or a small ship and is internally provided with a hollow space for causing a fluid such as liquid and gas to pass through.

In addition, the raw material forming the hollow piping member according to the present embodiment may be formed of a rubber material, a resin material, or a metal material. Otherwise, the raw material may be a laminated body or a connected body thereof.

The mesh-patterned resin molded product 10 according to the present embodiment has a plurality of first resin wired portions 11 extending parallel to each other and a plurality of second resin wired portions 12 extending parallel to each other in a direction respectively intersecting the first resin wired portions 11. Each of the first resin wired portions 11 and each of the second resin wired portions 12 are joined to each other on a joint portion 13 positioned at the mutual intersection portion 14.

The cross-sectional shape of the first resin wired portion 11 (the cross-sectional shape orthogonal to an axial center 11a of the first resin wired portion 11) is not particularly limited. However, for example, it is preferable that the cross section has an oval shape such as a circle shape, an elliptical shape, and an egg shape. The same is applied to the cross-sectional shape of the second resin wired portion 12.

The mesh-patterned resin molded product 10 may have a tube shape or a sheet shape.

As shown in FIGS. 1(a) and 1(b), in the present embodiment described below, the mesh-patterned resin molded product 10 has a tube shape, that is, a mesh-patterned resin tube.

In the mesh-patterned resin tube, the plurality of first resin wired portions 11 are spirally wound so as to be coaxial to each other. In addition, the plurality of second resin wired portions 12 are spirally wound so as to be coaxial to each other and to rotate opposite to the plurality of first resin wired portions 11, on an outer circumferential side of the plurality of first resin wired portions 11.

On the joint portion 13 (refer to FIGS. 1(b), 1(c), and 2) positioned at the intersection portion 14 between each of the first resin wired portions 11 and each of the second resin wired portions 12, each of the first resin wired portions 11 and each of the second resin wired portions 12 are joined to each other.

The cross-sectional shape of the mesh-patterned resin tube, that is, the shape of an opening when the mesh-patterned resin tube is viewed in a direction of the axial center thereof is an oval shape such as a circle shape, an elliptical shape, and an egg shape.

Here, at the intersection portion 14 between the first resin wired portion 11 and the second resin wired portion 12 which are joined to each other, a direction passing through both the axial centers 11a and 12a of the first resin wired portion 11 and the second resin wired portion 12 (FIGS. 1(c) and 2) and being orthogonal to both the axial centers 11a and 12a is set to an orthographic projection direction P (FIGS. 1(b) and 2). That is, the orthographic projection direction P is a direction orthogonal to the sheet of FIG. 1(c).

When the first resin wired portion 11 and the second resin wired portion 12 are viewed in the orthographic projection direction P, a second surface area that is a surface area of the joint portion 13 between the first resin wired portion 11 and the second resin wired portion is smaller than a first surface area that is an overlapping surface area between the first resin wired portion 11 and the second resin wired portion 12 (refer to FIG. 1(c)).

Accordingly, mobility of the joint portion 13 can be obtained, and the first resin wired portion 11 and the second resin wired portion 12 can relatively change the angle while having the joint portion 13 as a fulcrum. Thus, the mesh-patterned resin molded product 10 can be stretched and shrink easily. In addition, according to the mesh-patterned resin molded product 10 according to the present embodiment, when the above-described joint structure is employed, heat transferred from the hollow piping member encased in the mesh-patterned resin molded product 10 when in use can be efficiently dispersed. Therefore, from the viewpoint of temperature durability (heat resistance), it is possible to be an excellent piping protective member.

There are cases where the mesh-patterned resin molded product 10 does not have sufficient stretchability when the product is in a stage immediately after being molded (primary product). In such a case, the mesh-patterned resin molded product 10 having favorable stretchability can be obtained by performing secondary processing for improving the mobility of the joint portion 13.

In addition, the mesh-patterned resin molded product 10 has a configuration in which the joint state of each of the first resin wired portions 11 and each of the second resin wired portions 12 has the above-described particular joint structure, and the overlapping surface area between the first resin wired portion 11 and the second resin wired portion 12 is configured to satisfy the above-described particular condition. Therefore, according to the mesh-patterned resin molded product 10, the hollow piping member can be encased and protected such that the outer surface of the hollow piping member and the mesh-patterned resin molded product 10 are in contact with each other with no gap. Accordingly, it is possible to prevent the occurrence of a disadvantage such as positional deviation of the mesh-patterned resin molded product 10 and partial exposure of the hollow piping member when in use.

Here, when an external force causing the mesh-patterned resin molded product 10 to be stretched and shrink is applied to the mesh-patterned resin molded product 10, it is preferable that the first resin wired portion 11 and the second resin wired portion 12 mainly have bending rigidity to a certain degree such that torsional deformation of the joint portion 13 occurs instead of bending deformation of the first resin wired portion 11 and the second resin wired portion 12 (deformation in which the axial directions of the first resin wired portion 11 and the second resin wired portion 12 are bent). The bending rigidity of the first resin wired portion 11 and the second resin wired portion 12 can be adjusted by setting the thickness (the outer diameter), the material, the molding conditions, and the like of the first resin wired portion 11 and the second resin wired portion 12.

The second surface area is preferably equal to or less than ¾ of the first surface area and is more preferably equal to or less than ⅔ of the first surface area. In this manner, sufficient mobility of the joint portion 13 can be realized.

Meanwhile, the second surface area is preferably equal to or greater than 1/20 of the first surface area and is more preferably equal to or greater than 1/10. In this manner, sufficient joint strength of the joint portion 13 can be obtained.

As illustrated in FIG. 3, the first resin wired portion 11 and the second resin wired portion 12, which are joined to each other, configure an X-link mechanism that can mutually oscillate while having the joint portions 13 thereof as fulcrums (fulcrums X1, X2, and the like shown in FIG. 3).

For example, the oscillation axis of the X-link mechanism extends in the orthographic projection direction P. The orthographic projection direction P is a direction orthogonal to the sheet of FIG. 3.

As described above, since the first resin wired portion 11 and the second resin wired portion 12, which are joined to each other, configure the X-link mechanism, the mesh-patterned resin molded product 10 can be stretched and shrink in the axial direction thereof. In addition, the mesh-patterned resin molded product 10 can also be bent.

When the mesh-patterned resin molded product 10 is stretched and shrinks in the axial direction thereof and is bent, the first resin wired portion 11 and the second resin wired portion 12, which are joined to each other, mutually change the angle (oscillate) while having the joint portions 13 thereof as the fulcrums (the fulcrums X1, X2, and the like shown in FIG. 3).

As shown in FIG. 3, when a pair of first resin wired portions 11 adjacent to each other and a pair of second resin wired portions 12 adjacent to each other oscillate while having the joint portions 13 thereof as the fulcrums (the fulcrums X1, X2, and the like shown in FIG. 3), the mesh 15 formed by the pair of first resin wired portions 11 adjacent to each other and the pair of second resin wired portions 12 adjacent to each other maintains a parallelogram shape (for example, a rhombic shape).

Therefore, the length from the fulcrum X1 to the fulcrum X2 shown in FIG. 3 is substantially and uniformly maintained in each of the states of FIGS. 3(*a*), 3(*b*), and 3(*c*). That is, lengths L1 (FIG. 3(*a*)), L2 (FIG. 3(*b*)), and L3 (FIG. 3(*c*)) are lengths equal to each other.

Here, the shape of the parallelogram shape includes not only a true parallelogram but also shapes which can be substantially considered as a parallelogram. For example, the shape includes a case where each side is slightly bent instead of being straight.

In a case where the mesh-patterned resin molded product 10 is a mesh-patterned resin tube as in the present embodiment, the mesh 15 is formed to have a curved surface shape instead of a flat surface shape. In this case, the mesh 15 having a parallelogram shape denotes that the shape of the mesh 15 is a parallelogram shape when the mesh 15 is viewed in a direction passing through the center of the mesh 15, in directions orthogonal to the axial center of the mesh-patterned resin tube.

As shown in FIG. 4(*b*), when the mesh-patterned resin tube is stretched in the axial direction, the mesh-patterned resin tube reduces in diameter. That is, in the state of FIG. 4(*b*), the diameter of the mesh-patterned resin tube becomes smaller than that in the ordinary state shown in FIG. 4(*a*).

Meanwhile, as shown in FIG. 4(*c*), when the mesh-patterned resin tube is compressed (squeezed) in the axial direction, the mesh-patterned resin tube increases in diameter. That is, in the state of FIG. 4(*c*), the diameter of the mesh-patterned resin tube becomes greater than that in the ordinary state shown in FIG. 4(*a*).

Depending also on the mobility of the joint portion 13, for example, as shown in FIG. 4(*b*), the mesh-patterned resin tube can be stretched in the axial direction until the second resin wired portions 12 adjacent to each other come into contact with each other. Similarly, for example, the mesh-patterned resin tube can be stretched in the axial direction until the first resin wired portions 11 adjacent to each other come into contact with each other.

Similarly, depending on the mobility of the joint portion 13 as well, for example, as shown in FIG. 4(*c*), the mesh-patterned resin tube can be compressed in the axial direction until the second resin wired portions 12 adjacent to each other come into contact with each other. Similarly, for example, the mesh-patterned resin tube can be compressed in the axial direction until the first resin wired portions 11 adjacent to each other come into contact with each other.

As shown in FIG. 5(a), the mesh-patterned resin tube can be smoothly bent in a direction in which the axial direction thereof is bent.

In addition, the mesh-patterned resin tube can be stretched and shrink locally in the axial direction. Accordingly, for example, in a state where the mesh-patterned resin tube increases in diameter, after the piping member 16 is inserted into the mesh-patterned resin tube, when both ends of the mesh-patterned resin tube are pulled and the mesh-patterned resin tube is stretched, as shown in FIGS. 5(b) and 5(c), the mesh-patterned resin tube can be reduced in diameter such that the inner circumference of the mesh-patterned resin tube is fitted to (in tight contact with) the piping member 16. Accordingly, the piping member 16 can be favorably held by the mesh-patterned resin tube.

The material configuring the mesh-patterned resin molded product 10 preferably incudes a thermoplastic resin, and it is more preferable to include any one or more kinds of resin selected from a group consisting of polyethylene, polypropylene, nylon, and polyethylene terephthalate, as the thermoplastic resin. Among others, from the viewpoint of applying favorable bendability in a well-balanced manner, an olefin-based resin material is preferably used. Particularly, from the viewpoint of improving the balance between the stretchability and the bendability of the mesh-patterned resin molded product 10, it is preferable that the resin material includes block polypropylene.

Here, in a case where the mesh-patterned resin molded product 10 is formed of an olefin-based resin material, favorable stretchability and bendability of the mesh-patterned resin molded product 10 can be easily realized.

Examples of the olefin-based resin material include polyethylene and polypropylene.

From the viewpoint of achieving favorable stretchability thereof, it is preferable that the mesh-patterned resin molded product 10 is formed of a resin material including a pigment. The pigment may be an organic pigment or an inorganic pigment. Among others, it is preferable that the pigment is formed of a resin material containing carbon black.

When the mesh-patterned resin molded product 10 is formed of a resin material containing carbon black, favorable stretchability and bendability of the mesh-patterned resin molded product 10 can be easily realized.

For example, as the carbon black, it is preferable to use furnace black or acetylene black.

Subsequently, a method of manufacturing a mesh-patterned resin molded product according to the present embodiment will be described.

Figure 6:
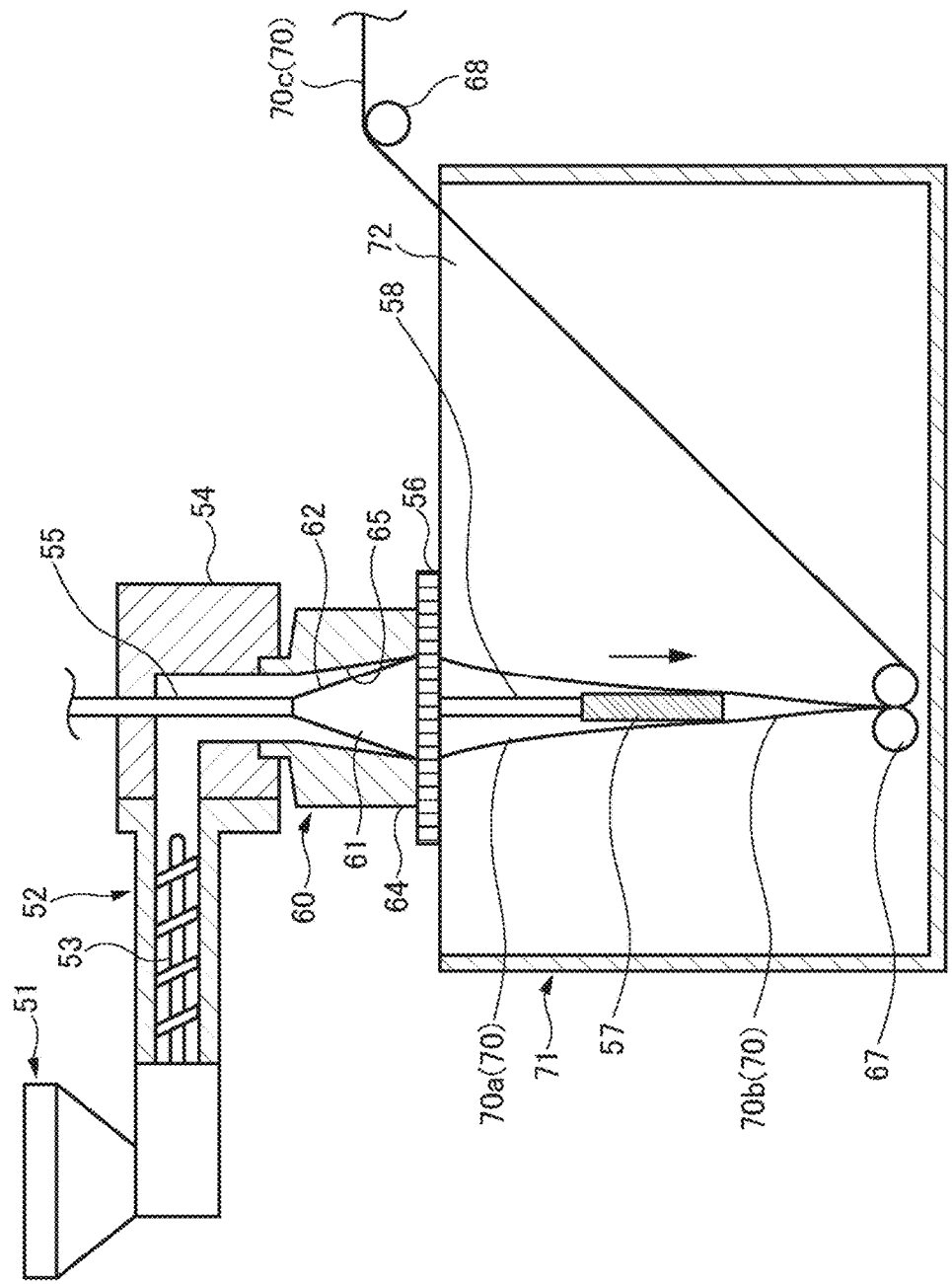
FIG. 6 is a cross-sectional view of the front showing an example of a manufacturing apparatus used in a method of manufacturing the mesh-patterned resin molded product according to the first embodiment.

FIG. 6 is a cross-sectional view of the front showing an example of a manufacturing apparatus 50 used in the method of manufacturing the mesh-patterned resin molded product according to the first embodiment.

Figure 7:
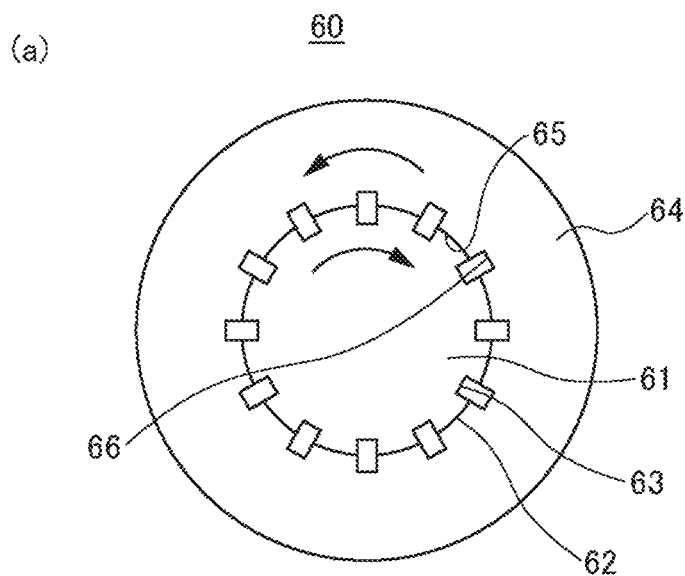
FIG. 7 is a view showing the structure of a die of the manufacturing apparatus used in the method of manufacturing the mesh-patterned resin molded product according to the first embodiment. In the view.
Figure 7:
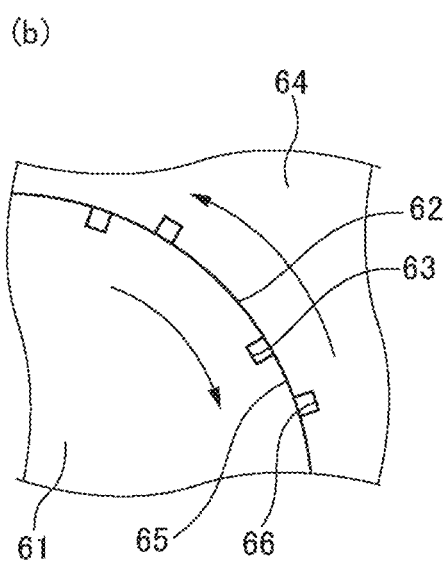
Figure 7:
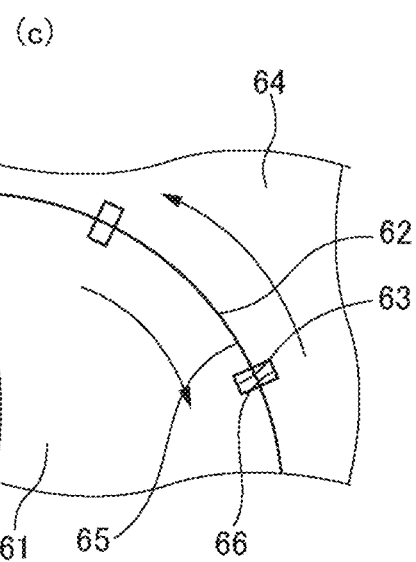

FIG. 7 is a view showing the structure of a die 60 of the manufacturing apparatus 50 used in the method of manufacturing the mesh-patterned resin molded product according to the first embodiment. In the view, FIG. 7(a) is a planar cross-sectional view, and FIGS. 7(b) and 7(c) are partially enlarged planar cross-sectional views. Each view of FIG. 7 is a planar cross-sectional view viewed from above (connection portion 54 side).

Figure 8:
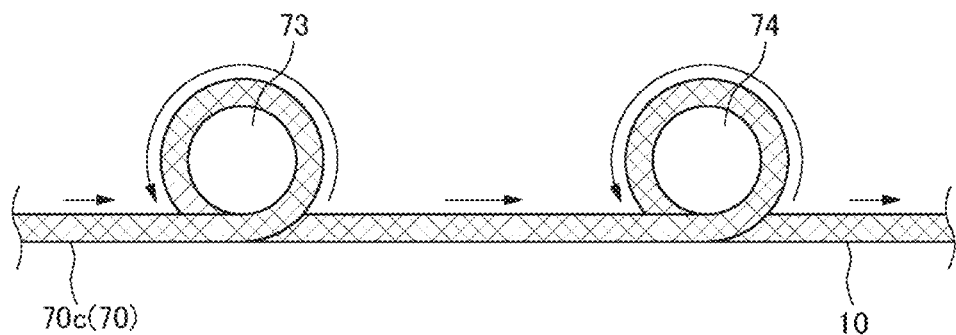
FIG. 8 is a view for describing an example of a step of improving the mobility of joint portions between a plurality of the first resin wired portions and a plurality of the second resin wired portions, in steps of the method of manufacturing the mesh-patterned resin molded product according to the first embodiment.

FIG. 8 is a view for describing an example of a step of improving the mobility of the joint portions 13 between the plurality of first resin wired portions 11 and the plurality of second resin wired portions 12, in steps of the method of manufacturing the mesh-patterned resin molded product according to the first embodiment.

FIG. 9(a) is a view for describing another example of the step of improving the mobility of the joint portions 13 between the plurality of first resin wired portions 11 and the plurality of second resin wired portions 12, in the steps of the method of manufacturing the mesh-patterned resin molded product according to the first embodiment, and FIG. 9(b) is a perspective view showing an example of the shapes of rollers 75 and 76 (rollers 78 and 79).

In the method of manufacturing a mesh-patterned resin molded product according to the present embodiment, the mesh-patterned resin molded product 10 is manufactured. The mesh-patterned resin molded product 10 includes the plurality of first resin wired portions 11 extending parallel to each other and the plurality of second resin wired portions 12 extending parallel to each other in a direction respectively intersecting the first resin wired portions 11. In the mesh-patterned resin molded product 10, each of the first resin wired portions 11 and each of the second resin wired portions 12 are joined to each other on the joint portion 13 positioned at the mutual intersection portion 14.

Here, at the intersection portion 14 between the first resin wired portion 11 and the second resin wired portion 12, which are joined to each other, a direction passing through both the axial centers 11a and 12a of the first resin wired portion 11 and the second resin wired portion 12 and being orthogonal to both the axial centers 11a and 12a is set to the orthographic projection direction P.

This manufacturing method has a step of molding a mesh-patterned structure body 70 by performing molding of the plurality of first resin wired portions 11 and the plurality of second resin wired portions 12 in parallel such that when the first resin wired portion 11 and the second resin wired portion 12 are viewed in the orthographic projection direction P, the second surface area that is the surface area of the joint portion 13 between the first resin wired portion 11 and the second resin wired portion 12 is smaller than the first surface area that is the overlapping surface area between the first resin wired portion 11 and the second resin wired portion 12.

Here, the mesh-patterned structure body 70 may become the mesh-patterned resin molded product 10 through the secondary processing performed with respect to the mesh-patterned structure body 70 (the mesh-patterned resin molded product 10 is manufactured), or the mesh-patterned structure body 70 may be the mesh-patterned resin molded product 10 itself.

In the present embodiment described below, the mesh-patterned structure body 70 is a primary product obtained through resin molding, and the mesh-patterned resin molded product 10 is manufactured through the secondary processing performed with respect to the mesh-patterned structure body 70.

For example, the step of molding the mesh-patterned structure body 70 is performed by using the manufacturing apparatus 50 shown in FIG. 6 and performing extrusion molding of a resin material through the die 60.

As the resin material, the above-described material is used. That is, for example, an olefin-based resin material is preferably used. In addition, for example, a resin material containing carbon black is preferably used.

As shown in FIG. 6, the manufacturing apparatus 50 includes an extruder 52 having a hopper 51 into which a resin material is inserted and a screw 53 which is provided inside, and melting and extruding the resin material; the die 60 molding and discharging the resin material into the shape of the mesh-patterned structure body 70, the connection portion 54 connecting the extruder 52 and the die 60 together, and a sizer 57 adjusting the inner diameter of the mesh-patterned structure body 70 discharged from the die 60.

Moreover, the manufacturing apparatus 50 includes a cooling water tank 71 storing cooling water 72 and cooling the mesh-patterned structure body 70 after being molded, a withdrawing roller 67 withdrawing the mesh-patterned structure body 70 after being molded, and a roller 68 being disposed between a winding device (not shown in the drawings) and the withdrawing roller 67 and engaging with the mesh-patterned structure body 70.

A resin material inserted into the hopper 51 is heated and melts in the extruder 52 and is extruded to the connection portion 54 side by the screw 53.

Inside the connection portion 54, a flow channel causing the internal space of the extruder 52 and the internal space of the die 60 to communicate with each other is formed. A molten resin material (molten resin) is supplied to the die 60 through the flow channel.

The die 60 has a dual structure including a first part 61 and a second part 64.

The first part 61 has a cone-shaped outer circumferential surface 62.

In the first part 61, the central axis of the conical shape thereof becomes a direction along the vertical direction, and the first part 61 is disposed in a posture in which the bottom portion side of the conical shape becomes the bottom and the apex portion side becomes the top.

In the outer circumferential surface 62, a plurality of first grooves 63 extending parallel to each other (refer to FIG. 7) are formed along a bus line on the outer circumferential surface 62 (a cone-shaped bus line forming the outer circumferential surface 62).

As shown in FIG. 7(*a*), in the lower end portion on the outer circumferential surface 62 of the first part 61, the plurality of first grooves 63 are formed with predetermined gaps (for example, uniform gaps) in the circumferential direction of the outer circumferential surface 62.

The second part 64 has a cone-shaped inner circumferential surface 65.

The inner circumferential surface 65 of the second part 64 is coaxial to the outer circumferential surface 62 of the first part 61, and the second part 64 is disposed in a posture in which the bottom portion side of the conical shape becomes the bottom and the apex portion side becomes the top.

In the inner circumferential surface 65, a plurality of second grooves 66 extending parallel to each other (refer to FIG. 7) are formed along a bus line on the inner circumferential surface 65 (a cone-shaped bus line forming the inner circumferential surface 65).

As shown in FIG. 7(*a*), in the lower end portion on the inner circumferential surface 65 of the second part 64, the plurality of second grooves 66 are formed with predetermined gaps (for example, uniform gaps) in the circumferential direction of the inner circumferential surface 65.

On an inner side of the inner circumferential surface 65 of the second part 64, the first part 61 is disposed. Therefore, the outer circumferential surface 62 of the first part 61 and the inner circumferential surface 65 of the second part 64 face each other.

That is, on the outer circumferential surface 62 and the inner circumferential surface 65, the grooves (the first grooves 63 and the second grooves 66) respectively open toward the opposite sides are formed.

The outer circumferential surface 62 and the inner circumferential surface 65 slide with respect to each other on a side where the resin material is discharged from the die 60, that is, on the lower end portion side of the die 60.

In the upper portion of the die 60, the outer circumferential surface 62 and the inner circumferential surface 65 are separated from each other. Accordingly, molten resin flowing down from the connection portion 54 can be smoothly received by the gap between the outer circumferential surface 62 and the inner circumferential surface 65.

The die 60 is configured such that the first part 61 and the second part 64 can relatively rotate around the axis.

The first part 61 is hung and supported by a rotary axis 55 extending upward from the upper end portion of the first part 61 so as to be coaxial to the first part 61 (coaxial to the conical shape configuring the outer circumferential surface 62 of the first part 61). The rotary axis 55 is driven by a first rotary drive mechanism (not shown in the drawings) and rotates around the axis. In accordance with the rotation thereof, the first part 61 fixed to the rotary axis 55 also rotates around the axis.

The rotary axis 55 is pivotally supported by a pivotal hole formed in the upper portion of the connection portion 54.

Meanwhile, in the lower end portion of the second part 64, a donut-shaped wheel 56 is fixed so as to be coaxial to the second part 64 (coaxial to the conical shape configuring the inner circumferential surface 65 of the second part 64). The wheel 56 is driven by a second rotary drive mechanism (not shown in the drawings) and rotates around the axis. In accordance with the rotation thereof, the second part 64 rotates around the axis.

The upper end portion of the second part 64 is supported in the lower portion of the connection portion 54 so as to be rotatable around the axis of the second part 64 relatively with respect to the connection portion 54.

At the center of the wheel 56, an opening having a diameter greater than a discharge portion of the die 60, that is, the lower ends of the outer circumferential surface 62 of the first part 61 and the inner circumferential surface 65 of the second part 64 is formed. In a planar view, the discharge portion of the die 60 is accommodated on the inner side of the opening of the wheel 56.

Here, the rotating directions and the rotating speeds (angular speeds) of the first part 61 and the second part 64 are set such that the first part 61 and the second part 64 relatively rotate around the axis.

More specifically, for example, the first part 61 and the second part 64 rotate in directions opposite to each other. In this case, for example, the first part 61 and the second part 64 rotate at the same rotating speed as each other. However, the rotating speeds of the first part 61 and the second part 64 may be different from each other.

For example, each of the first part 61 and the second part 64 rotates at a uniform rotating speed. In this manner, the spiral winding pitch of each of the first resin wired portion 11 and the second resin wired portion 12 can be uniform in the longitudinal direction of the mesh-patterned structure body 70 as well as the mesh-patterned resin molded product 10.

The sizer 57 is formed to have a columnar shape or a cylindrical shape and is disposed below the wheel 56 so as to be coaxial to the first part 61 and the second part 64 of the die 60.

The sizer 57 is hung and supported from the lower surface of the second part 64 through a sizer support portion 58 having a shape of a rod or the like. The upper end of the sizer support portion 58 is fixed to the lower surface of the second part 64 through the opening of the wheel 56.

For example, the sizer 57 can rotate around the axis with respect to the first part 61. Accordingly, a rotary force is restrained from being transmitted from the first part 61 to the sizer 57. Therefore, the sizer 57 is restrained from rotating inside the mesh-patterned structure body 70 discharged from the die 60, and the sizer 57 runs idle with respect to the first part 61.

Here, the inner diameters of the mesh-patterned structure body 70 and the mesh-patterned resin molded product 10 are molded in sizes corresponding to the outer diameter of the sizer 57.

The outer diameter of the sizer 57 is set so as to be equal to or smaller than the diameter of the discharge portion of the die 60, that is, the diameters of the lower ends of the outer circumferential surface 62 of the first part 61 and the inner circumferential surface 65 of the second part 64.

That is, the step of molding the mesh-patterned structure body 70 is performed in a state where the sizer 57 having a diameter smaller than the discharge portion of the die is disposed on the downstream side of the die 60. That is, the mesh-patterned structure body 70 (the mesh-patterned resin molded product 10) is molded through so-called deflation molding.

Accordingly, the mesh-patterned structure body 70 and the mesh-patterned resin molded product 10 can be molded such that the inner diameters of the mesh-patterned structure body 70 and the mesh-patterned resin molded product 10 become equal to or smaller than the diameter of the discharge portion of the die 60.

The withdrawing roller 67 is configured to have a pair of rotary rollers and is disposed lower than the sizer 57. The withdrawing roller 67 withdraws the mesh-patterned structure body 70 (mesh-patterned structure body 70b) after being molded by the sizer 57.

For example, in the cooling water tank 71, the cooling water 72 is stored to a water level same as the height of the lower surface of the wheel 56. The sizer 57 and the withdrawing roller 67 are submerged in the cooling water 72.

The roller 68 is disposed on a downstream side of the withdrawing roller 67.

The roller 68 is disposed outside the cooling water tank 71 and engages with the mesh-patterned structure body 70 (mesh-patterned structure body 70c) after being cooled by the cooling water 72.

Figure 9:
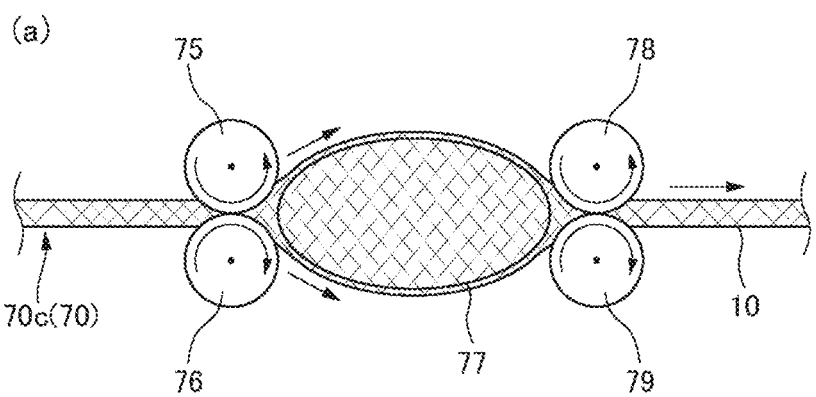
FIG. 9(a) is a view for describing another example of the step of improving the mobility of the joint portions between the plurality of first resin wired portions and the plurality of second resin wired portions, in the steps of the method of manufacturing the mesh-patterned resin molded product according to the first embodiment.
FIG. 9(b) is a perspective view showing an example of the shapes of rollers.
Figure 9:
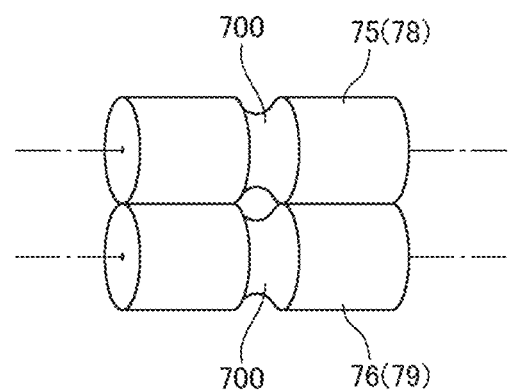

For example, the manufacturing apparatus 50 includes a mobility improvement mechanism shown in FIG. 8 or 9.

The mobility improvement mechanism performs the secondary processing for improving the mobility of the joint portions 13 between the plurality of first resin wired portions 11 and the plurality of second resin wired portions 12.

The mobility improvement mechanism is disposed on the downstream side of the roller 68 (FIG. 6) and on the upstream side of the winding device (not shown in the drawings).

In the secondary processing, the mesh-patterned structure body 70c is deformed by adding a force with respect to the mesh-patterned structure body 70c (primary product) in a direction in which the angle formed by the first resin wired portion 11 and the second resin wired portion 12 joined to each other on the joint portion 13 changes. More specifically, while having the orthographic projection direction P as the rotary axis, the mesh-patterned structure body 70c is deformed by adding a force to the mesh-patterned structure body 70c in a direction in which the angle formed by the first resin wired portion 11 and the second resin wired portion 12 changes.

When the mesh-patterned structure body 70c is deformed as described above, the joint portion 13 is embrittled (torsional rigidity of the joint portion 13 deteriorates). As a result, the mobility of the joint portion 13 is improved.

For example, the joint portion 13 is embrittled without entailing rupture (detachment). More specifically, for example, deformation in which elastic deformation and plastic deformation are concurrently present occurs in the joint portions 13. Accordingly, the joint portions 13 are partially stretched (plastic-deformed) in a state where the joint portions 13 in their entirety are still connected to each other (without entailing rupture of the joint portion 13). Therefore, torsional rigidity of the joint portion 13 deteriorates.

Otherwise, the joint portion 13 is embrittled by being partially ruptured (detached) (for example, the circumferential edge portion is ruptured). The method of manufacturing a mesh-patterned resin molded product in this case includes a step in which a force is added to a joint portion between the first resin wired portion 11 and the second resin wired portion 12 by deforming the primary product, and the joint portion is partially ruptured (detached) such that a part (for example, a central portion) of the joint portion remains as the final joint portion 13.

The mobility improvement mechanism shown in FIG. 8 includes a stretching roller 73 and a stretching roller 74 which is disposed on the downstream side of the stretching roller 73.

A rotary drive force is applied to the stretching roller 73 by a first roller drive mechanism (not shown in the drawings). The stretching roller 73 rotates at a first rotating speed in a state of engaging with the mesh-patterned structure body 70c and transports the mesh-patterned structure body 70c to the downstream side at a first conveyance speed.

A rotary drive force is applied to the stretching roller 74 by a second roller drive mechanism (not shown in the drawings). The stretching roller 74 rotates at a second rotating speed faster than the first rotating speed in a state of engaging with the mesh-patterned structure body 70c and transports the mesh-patterned structure body 70c to the downstream side at a second conveyance speed faster than the first conveyance speed.

Accordingly, the mesh-patterned structure body 70c is stretched (that is, deformed) in the axial direction of the mesh-patterned structure body 70c, between the stretching roller 73 and the stretching roller 74. Accordingly, the mobility of the joint portions 13 between the plurality of first resin wired portions 11 and the plurality of second resin wired portions 12 of the mesh-patterned structure body 70c is improved.

That is, in a case of using the mobility improvement mechanism in FIG. 8, the mesh-patterned resin tube serving as the mesh-patterned structure body 70c is stretched in the axial direction, thereby performing the step of improving the mobility of the joint portions 13 between the plurality of first resin wired portions 11 and the plurality of second resin wired portions 12.

It is preferable that the mesh-patterned structure body 70c is transported by the stretching roller 73 in a state where the mesh-patterned structure body 70c is wound around the stretching roller 73 (for example, wound a plurality of times) as shown in FIG. 8 such that the mesh-patterned structure body 70c can be sufficiently gripped by the stretching roller 73. In this manner, the mesh-patterned structure body 70c can be restrained from sliding with respect to the stretching roller 73.

In addition, it is also preferable that the surface of the stretching roller 73 is an uneven surface (rough surface) such that the mesh-patterned structure body 70c can be sufficiently gripped by the stretching roller 73.

Similarly, it is preferable that the mesh-patterned structure body 70c is transported by the stretching roller 74 in a state where the mesh-patterned structure body 70c is wound around the stretching roller 74 (for example, wound a plurality of times) as shown in FIG. 8 such that the mesh-patterned structure body 70c can be sufficiently gripped by the stretching roller 74. In this manner, the mesh-patterned structure body 70c can be restrained from sliding with respect to the stretching roller 74.

In addition, it is also preferable that the surface of the stretching roller 74 is an uneven surface (rough surface) such that the mesh-patterned structure body 70c can be sufficiently gripped by the stretching roller 74.

Meanwhile, the mobility improvement mechanism shown in FIG. 9 includes a diameter increasing member 77 causing the mesh-patterned structure body 70c to increase in diameter, a pair of rollers 75 and 76 disposed on the upstream side of the diameter increasing member 77, and a pair of rollers 78 and 79 disposed on the downstream side of the diameter increasing member 77 (FIG. 9(a)).

The diameter increasing member 77 is a member having a rugby ball shape (or an egg shape) of which the short-side diameter is greater than the inner diameter of the mesh-patterned structure body 70c. The long-side diameter is disposed along the conveying direction of the mesh-patterned structure body 70c.

The distance from the pair of rollers 75 and 76 to the pair of rollers 78 and 79 is set to a distance to a degree slightly longer than the long-side diameter of the diameter increasing member 77.

The pair of rollers 75 and 76 transports the mesh-patterned structure body 70c to the downstream side in a state of interposing the mesh-patterned structure body 70c therebetween. Accordingly, the mesh-patterned structure body 70c extrapolates the surrounding of the diameter increasing member 77. A rotary drive force is applied to the pair of rollers 75 and 76 by a roller drive mechanism (not shown in the drawings).

The pair of rollers 78 and 79 transports the mesh-patterned structure body 70c to the downstream side in a state of interposing the mesh-patterned structure body 70c therebetween. A drive force may be applied to the pair of rollers 78 and 79 or does not have to be applied thereto.

The diameter increasing member 77 is wrapped by the mesh-patterned structure body 70c between the pair of rollers 75 and 76 and the pair of rollers 78 and 79 and is held by the mesh-patterned structure body 70c.

In addition, the pair of rollers 78 and 79 on the downstream side restricts the diameter increasing member 77 from drifting to the downstream side.

As shown in FIG. 9(b), at the center in the width direction of each of the rollers 75, 76, 78, and 79, a groove 700 having an arc shape in a sectional view and making one rotation around each of the rollers 75, 76, 78, and 79 in the circumferential direction is formed.

Accordingly, the mesh-patterned structure body 70c can be held in a gap between the grooves 700 of the pair of rollers 75 and 76 by an appropriate interposing force. Similarly, the mesh-patterned structure body 70c can be held in a gap between the grooves 700 of the pair of rollers 78 and 79 by an appropriate interposing force.

In addition, the end of the diameter increasing member 77 on the downstream side can be preferably positioned in the gap between the grooves 700 of the pair of rollers 78 and 79 on the downstream side.

When the mobility of the joint portion 13 is improved by the mobility improvement mechanism shown in FIG. 9, while the mesh-patterned structure body 70c extrapolates the diameter increasing member 77, the mesh-patterned structure body 70c is transported to the downstream side. Accordingly, when the mesh-patterned structure body 70c passes through the surrounding of the diameter increasing member 77, the mesh-patterned structure body 70c increases in diameter and is squeezed in the axial direction. Accordingly, the mobility of the joint portions 13 between the plurality of first resin wired portions 11 and the plurality of second resin wired portions 12 of the mesh-patterned structure body 70c is improved.

That is, in a case of using the mobility improvement mechanism in FIG. 9, the mesh-patterned resin tube serving as the mesh-patterned structure body 70c is squeezed in the axial direction, thereby performing the step of improving the mobility of the joint portions 13 between the plurality of first resin wired portions 11 and the plurality of second resin wired portions 12.

Here, it is preferable that the strength of a force of interposing the mesh-patterned structure body 70c between the pair of rollers 75 and 76 and between the pair of rollers 78 and 79 is limited to a degree that the first resin wired portion 11 and the second resin wired portion 12 of the mesh-patterned structure body 70c are not bent. In this manner, the stretchability of the mesh-patterned resin molded product 10 can be restrained from deteriorating due to the bending of the first resin wired portion 11 and the second resin wired portion 12.

In addition, it is also preferable that the surface of each of the rollers 75, 76, 78, and 79 is an uneven surface (rough surface) such that the mesh-patterned structure body 70c can be sufficiently gripped by the pair of rollers 75 and 76, and the pair of rollers 78 and 79.

Hereinafter, a series of operations of manufacturing the mesh-patterned resin molded product 10 by using the manufacturing apparatus 50 will be described.

When manufacturing the mesh-patterned resin molded product 10, extruding molten resin by the extruder 52, discharging the molten resin from the die 60 (that is, the mesh-patterned structure body 70), withdrawing the mesh-patterned structure body 70 by the withdrawing roller 67, an operation for improving the mobility of the joint portion 13 of the mesh-patterned structure body 70c performed by the mobility improvement mechanism, and winding the mesh-patterned resin molded product 10 by the winding device (not shown in the drawings are concurrently and continuously performed.

First, the resin material inserted into the hopper 51 is heated and caused to melt by the extruder 52. The resin material is supplied to the die 60 through the flow channel of the connection portion 54.

Here, the first part 61 and the second part 64 of the die 60 relatively rotate around the axis.

As shown in FIG. 7(b), at the time of when the first groove 63 of the first part 61 and the second groove 66 of the second part 64 are separated from each other, discharging is performed through a discharge port of the die 60 in a state where the first resin wired portion 11 and the second resin wired portion 12 are separated from each other.

That is, the first resin wired portion 11 is molded by the resin material discharged from between the first groove 63 and a part other than the forming location of the second groove 66 on the inner circumferential surface 65 of the second part 64. At the same time, the second resin wired portion 12 separated from the first resin wired portion 11 is molded by the resin material discharged from between the second groove 66 and a part other than the forming location of the first groove 63 on the outer circumferential surface 62 of the first part 61.

Meanwhile, As shown in FIG. 7(c), at the time of when the first groove 63 of the first part 61 and the second groove 66 of the second part 64 face each other and communicate with each other, discharging is performed through the discharge port of the die 60 in a state where the first resin wired portion 11 and the second resin wired portion 12 intersecting each other are joined to each other through the joint portion 13.

That is, the first resin wired portion 11 and the second resin wired portion 12 integrated together are discharged through an opening which is generated by the first groove 63 and the second groove 66 which are overlapped.

The joint portion 13 is a fused portion in which the first resin wired portion 11 and the second resin wired portion 12 are fused together.

In this manner, the mesh-patterned structure body 70 (mesh-patterned structure body 70a) having a shape equal to that of the mesh-patterned resin molded product 10 shown in FIG. 1 is continuously discharged through the discharge port of the die 60.

As described above, in the step of molding the mesh-patterned structure body 70, while the first part 61 and the second part 64 relatively rotate around the axis, extrusion molding of the resin material is performed through the gap between the plurality of first grooves 63 and the second groove 66, and the gap between the plurality of second grooves 66 and the first part 61, thereby molding the mesh-patterned resin tube formed by the plurality of first resin wired portions 11 which are spirally wound so as to be coaxial to each other, and the plurality of second resin wired portions 12 which are spirally wound so as to be coaxial to each other and rotate opposite to the plurality of first resin wired portions 11, on the outer circumferential side of the plurality of first resin wired portions 11.

The mesh-patterned structure body 70a discharged from the die 60 is submerged in the cooling water 72 inside the cooling water tank 71. While being cooled in the cooling water 72, the mesh-patterned structure body 70a goes through an adjustment of the inner diameter performed by the sizer 57 and is withdrawn by the withdrawing roller 67. Here, the outer diameter of the sizer 57 is equal to or smaller than the diameter of the discharge portion of the die 60. Accordingly, between the first resin wired portion 11 and the second resin wired portion 12, the first resin wired portion 11 positioned on the inner circumference side is restrained from being strongly pressed against the second resin wired portion 12 positioned on the outer circumferential side.

Furthermore, the surface area of the joint portion 13 between the first resin wired portion 11 and the second resin wired portion 12 is appropriately restrained from being widened. As a result, in the mesh-patterned structure body 70 (the mesh-patterned structure body 70b) as well as the mesh-patterned resin molded product 10 which has gone through an adjustment of the inner diameter performed by the sizer 57, as shown in FIG. 1(c), the second surface area becomes smaller than the first surface area.

The mesh-patterned structure body 70b after being withdrawn by the withdrawing roller 67 is transported toward the roller 68 and comes out of the cooling water tank 71 during the process thereof.

With respect to the mesh-patterned structure body 70 (the mesh-patterned structure body 70c) after engaging with the roller 68, during a process of being wound by the winding device (not shown in the drawings), the step of improving the mobility of each joint portion 13 is performed by the mobility improvement mechanism shown in FIG. 8 or the mobility improvement mechanism shown in FIG. 9.

The mesh-patterned structure body 70 which has gone through this step becomes the mesh-patterned resin molded product 10.

As described above, in the manufacturing method according to the present embodiment, the step of molding the mesh-patterned structure body 70, the step of cooling the mesh-patterned structure body 70, and the step of improving the mobility of the joint portion 13 are performed in order as described above.

The mesh-patterned resin molded product 10 that is the mesh-patterned structure body 70 after going through the step of improving the mobility of each joint portion 13 is not necessarily wound by the winding device. For example, the mesh-patterned resin molded product 10 may be cut into predetermined longitudinal dimensions by an automatic cutting apparatus.

According to the first embodiment described above, when the first resin wired portion 11 and the second resin wired portion 12, which are joined to each other, are viewed in the orthographic projection direction P, the second surface area that is the surface area of the joint portion 13 between the first resin wired portion 11 and the second resin wired portion 12 is smaller than the first surface area that is the overlapping surface area between the first resin wired portion 11 and the second resin wired portion 12.

Accordingly, favorable mobility of the joint portion 13 can be realized. Therefore, the mesh-patterned resin molded product 10 can have excellent stretchability. Thus, the mesh-patterned resin molded product 10 can be stretched and shrink with light force.

Since the mesh-patterned resin molded product 10 has favorable stretchability, bendability is also favorable.

Even if the mesh-patterned structure body 70 (primary product) does not have sufficient stretchability, the mesh-patterned resin molded product 10 having favorable stretchability can be achieved by performing the secondary processing for improving the mobility of the joint portion 13 with respect to the mesh-patterned structure body 70.

That is, in a case where the mesh-patterned resin molded product 10 is the mesh-patterned resin tube, the mobility of the joint portion 13 can be improved by performing a step of stretching the mesh-patterned resin tube in the axial direction or a step of squeezing the mesh-patterned resin tube in the axial direction.

The step of stretching the mesh-patterned resin tube in the axial direction and the step of squeezing the mesh-patterned resin tube in the axial direction may be selectively performed, or both the steps may be executed. For example, favorable mobility of the joint portion 13 can be manifested by alternately repeating both the steps.

In addition, the secondary processing for improving the mobility of the joint portion 13 may be performed with respect to the mesh-patterned structure body 70 in its entirety or may be selectively performed with respect to a part of the mesh-patterned structure body 70. According to the former case, the stretchability of the mesh-patterned resin molded product 10 can be uniform in the mesh-patterned resin molded product 10 in its entirety. Meanwhile, according to the latter case, favorable stretchability can be selectively manifested in a part of the mesh-patterned resin molded product 10.

The secondary processing for improving the mobility of the joint portion 13 can be performed through manual work, in addition to the method described above by using FIGS. 8 and 9. That is, for example, favorable stretchability of the mesh-patterned resin molded product 10 may be manifested by manually stretching the mesh-patterned resin molded product 10 that is the mesh-patterned resin tube or manually squeezing the mesh-patterned resin molded product 10. For example, a user using the mesh-patterned resin molded product 10 may selectively perform the secondary processing with respect to a part of the mesh-patterned structure body 70 before using the mesh-patterned resin molded product 10, thereby causing only a necessary part to have favorable stretchability.

In a case where the mesh-patterned resin molded product 10 is the mesh-patterned resin tube as in the present embodiment, the mesh-patterned resin molded product 10 can be stretched and shrink in the axial direction with light force.

The mesh-patterned resin molded product 10 that is the mesh-patterned resin tube reduces in diameter when being stretched in the axial direction and increases in diameter when being compressed in the axial direction.

In a case where the mesh-patterned resin molded product 10 that is the mesh-patterned resin tube is also compressed in the radial direction from the surrounding (for example, in a case of being held by hand), the mesh-patterned resin molded product 10 reduces in diameter.

In addition, since the mesh-patterned resin molded product 10 also has favorable bendability, a kink is restrained from being generated when bent.

More specifically, for example, the first resin wired portion 11 and the second resin wired portion 12, which are joined to each other, configure the X-link mechanism that can mutually oscillate while having the joint portions 13 thereof as fulcrums.

Thus, when the mesh-patterned resin molded product 10 is stretched and shrinks in the axial direction thereof and is bent, the first resin wired portion 11 and the second resin wired portion 12, which are joined to each other, mutually change the angle while having the joint portions 13 as the fulcrums. At this time, for example, the mesh 15 maintains a parallelogram shape.

In other words, the mesh-patterned resin molded product 10 can be stretched and shrink without substantially entailing bending (deflecting) of each of the first resin wired portions 11 and each of the second resin wired portions 12. Therefore, a significant stretching rate of the mesh-patterned resin molded product 10 can be obtained.

Here, FIG. 15 is a view for describing an operation of the mesh-patterned resin molded product according to a comparative embodiment. In the view, FIG. 15(*a*) shows an ordinary state where no external force is applied to the mesh-patterned resin molded product according to the comparative embodiment, and FIG. 15(*b*) shows a state where the mesh-patterned resin molded product according to the comparative embodiment is stretched.

The mesh-patterned resin molded product according to the comparative embodiment has a plurality of first resin wired portions 81 extending parallel to each other and a plurality of second resin wired portions 82 extending parallel to each other in a direction respectively intersecting the first resin wired portions 81. Each of the first resin wired portions 81 and each of the second resin wired portions 82 are joined to each other on a joint portion positioned at the mutual intersection portion.

In this regard, the mesh-patterned resin molded product according to the comparative embodiment is similar to the mesh-patterned resin molded product 10 according to the present embodiment.

However, in the mesh-patterned resin molded product according to the comparative embodiment, the first surface area and the second surface area described above are equal to each other.

For example, the mesh-patterned resin molded product according to the comparative embodiment is manufactured through so-called inflation molding which is performed by using a sizer of which the outer diameter is greater than the diameter of the discharge portion of the die.

Accordingly, when the mesh-patterned resin molded product passes through the sizer, the first resin wired portion 81 is strongly pressed against the second resin wired portion 82. Therefore, the first surface area and the second surface area become surface areas equal to each other.

Thus, the mobility of the joint portion between the first resin wired portion 81 and the second resin wired portion 82 is poor. Substantially, the first resin wired portion 81 and the second resin wired portion 82 are fixed to each other on the joint portion.

When the mesh-patterned resin molded product is stretched in a direction of the arrow shown in FIG. 15(*b*), a relative change in the angle between the first resin wired portion 81 and the second resin wired portion 82 having the joint portions as the fulcrums (fulcrums X11, X12, and the like shown in FIG. 15) does not substantially occur. Instead, the mesh-patterned resin molded product is stretched due to bending deformation (deflecting deformation) of the first resin wired portion 81 and the second resin wired portion 82.

Accordingly, the stretching rate of the mesh-patterned resin molded product according to the comparative embodiment is small compared to the mesh-patterned resin molded product 10 according to the present embodiment.

A length L13 shown in FIG. 15(*b*) becomes shorter than a length L11 shown in FIG. 15(*a*). The surface area of a mesh 85 shown in FIG. 15(*b*) becomes smaller than the surface area of the mesh 85 shown in FIG. 15(*a*).

When the mesh-patterned resin molded product according to the comparative embodiment is stretched and shrinks in a direction of the arrow shown in FIG. 15(*b*), the mesh-patterned resin molded product is deformed between a state where four sides forming the mesh are bent (FIG. 15(*b*)) and a state of being restored to the original straight state (FIG. 15(*a*)). Accordingly, in accordance with the mesh-patterned resin molded product being stretched and shrinking, the distance between the fulcrum X11 and the fulcrum X12 is also stretched and shrinks.

The mesh-patterned resin molded product according to the comparative embodiment can be stretched in the direction of the arrow in FIG. 15(*b*) to a certain degree. However, it is difficult to be stretched (is hardly stretched) in a direction orthogonal to the arrow in FIG. 15(*b*).

Second Embodiment

Figure 10:
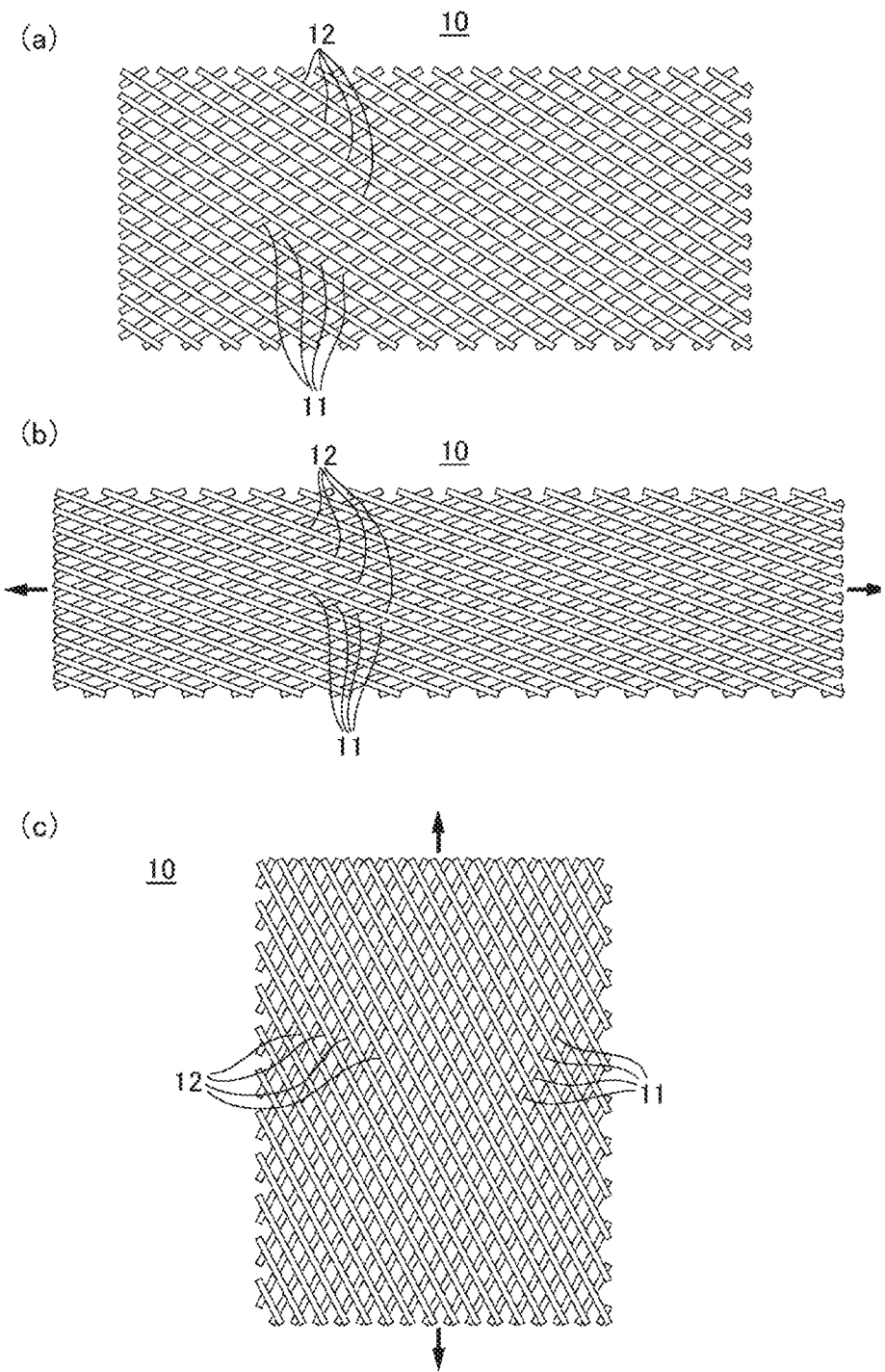
FIG. 10 is a plan view of a mesh-patterned resin molded product according to a second embodiment. In the view.

FIG. 10 is a plan view of a mesh-patterned resin molded product 10 according to a second embodiment. In the view, FIG. 10(*a*) shows an ordinary state where no external force is applied to the mesh-patterned resin molded product 10, FIG. 10(*b*) shows a state where the mesh-patterned resin molded product 10 is stretched in a first direction, and FIG.

10(c) shows a state where the mesh-patterned resin molded product 10 is stretched in a second direction orthogonal to the first direction.

In the first embodiment, an example in which the mesh-patterned resin molded product 10 is the mesh-patterned resin tube has been described. However, in the case of the present embodiment, the mesh-patterned resin molded product 10 has a sheet shape. For example, similar to the first embodiment, after the mesh-patterned resin molded product 10 that is the mesh-patterned resin tube is manufactured, a sheet-shaped mesh-patterned resin molded product 10 can be obtained by cutting and opening the mesh-patterned resin molded product 10.

Therefore, in regard to the joint portion 13 between each of the first resin wired portions 11 and each of the second resin wired portions 12, the case of the present embodiment is similar to the first embodiment. Accordingly, the stretchability of the mesh-patterned resin molded product 10 is similar to that of the first embodiment.

As shown in FIG. 10, the mesh-patterned resin molded product 10 can be significantly stretched and shrink in the first direction and can also be significantly stretched and shrink in the second direction orthogonal to the first direction.

In each of the embodiments, an example in which the first part 61 and the second part 64 of the die 60 rotate in directions opposite to each other at a uniform rotating speed has been described. However, the embodiments are not limited to the example. The shape of the mesh in the mesh-patterned resin tube can be variously changed by varying the relative movement of the first part 61 and the second part 64.

EXAMPLES

Example 1

As a mesh-patterned resin molded product 10 according to Example 1, the mesh-patterned resin molded product 10 according to the first embodiment was manufactured. As the molding conditions, polypropylene containing carbon black was used as the resin material. The long-side diameter (the width direction) of each of the first resin wired portion 11 and the second resin wired portion 12 having an elliptical shape was set to 1.4 mm and the short-side diameter (the thickness direction) was set to 1.2 mm. There were provided 12 first resin wired portions 11 and 12 second resin wired portions 12. The pitch between the intersection points (the distance between the intersection points adjacent to each other, that is, the distance between the centers of the joint portions 13 adjacent to each other) in the mesh-patterned structure body 70c (primary product) was set to 7.0 mm in the axial direction of the mesh-patterned resin tube and was set to 3.0 mm in the width direction of the mesh-patterned resin tube. The inner diameter of the mesh-patterned resin tube serving as the mesh-patterned structure body 70c (primary product) was set to 9.0 mm, and the winding pitch between the first resin wired portion 11 and the second resin wired portion 12 (the length of the mesh-patterned structure body 70c in the axial direction of the mesh-patterned resin tube in which the first resin wired portion 11 and the second resin wired portion 12 make one rotation) was set to 84.0 mm. The mobility of the joint portion 13 was improved by manually causing the mesh-patterned structure body 70c after being molded to be stretched and shrink in the axial direction, thereby obtaining the mesh-patterned resin molded product 10 according to Example 1.

At the intersection portion between the first resin wired portion 11 and the second resin wired portion 12 in the obtained mesh-patterned resin molded product 10, a direction passing through both the axial centers of the first resin wired portion 11 and the second resin wired portion 12 and being orthogonal to both the axial centers was set to an orthographic projection direction. In a case where the first resin wired portion 11 and the second resin wired portion 12 were viewed in the orthographic projection direction, the ratio of the surface area B (the second surface area) of the joint portion between the first resin wired portion 11 and the second resin wired portion 12 to the overlapping surface area A (the first surface area) between the first resin wired portion 11 and the second resin wired portion 12, that is, the value of B/A was 0.54.

Figure 11:
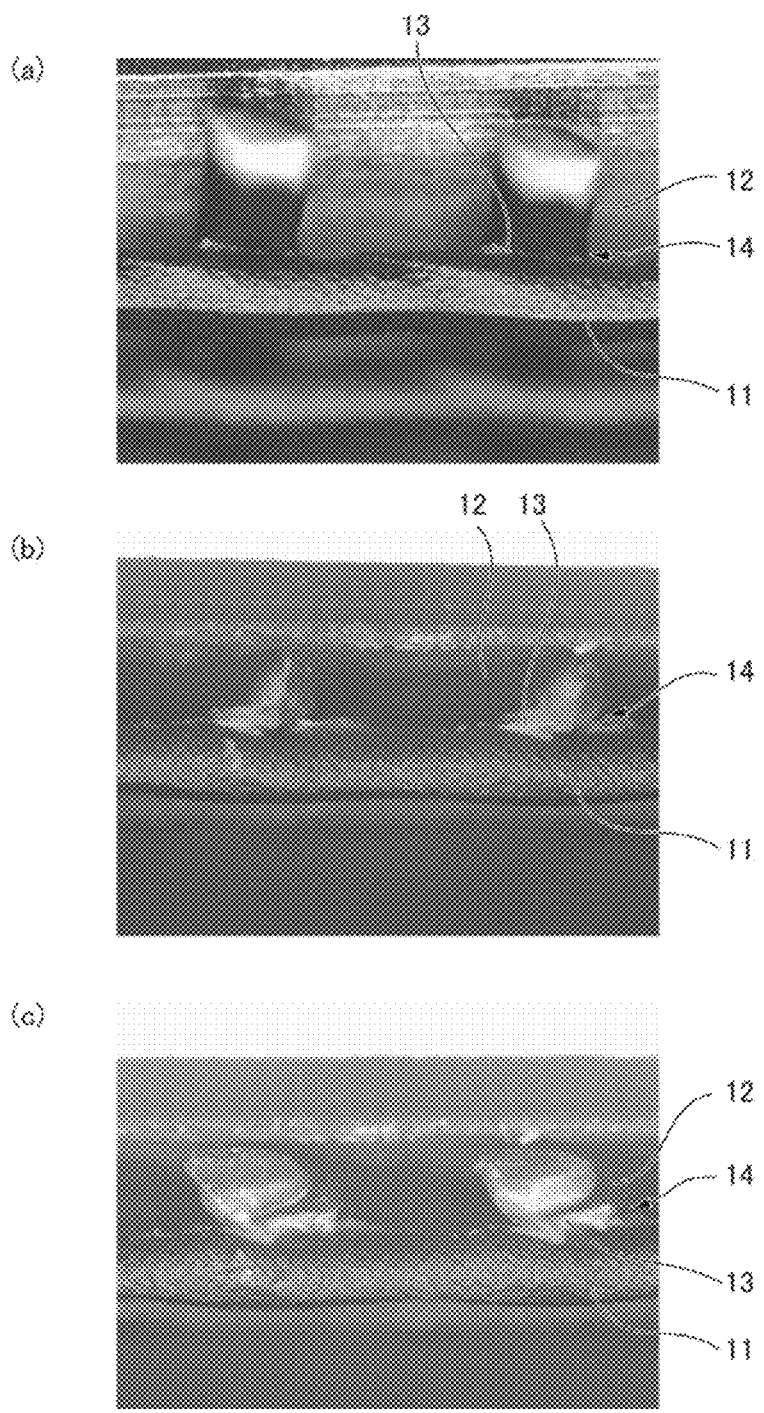
FIG. 11 is a view showing a portion in the vicinity of a joint portion of a mesh-patterned resin molded product according to Example 1. In the view.

FIG. 11 is a view showing a portion in the vicinity of the joint portion 13 of the mesh-patterned resin molded product 10 according to Example 1 (both are photomicrographs). In the view, FIG. 11(a) shows a state before the step of improving the mobility of the joint portion 13 is performed (the state of the mesh-patterned structure body 70c), and FIGS. 11(c) and 11(c) show states after the step (the states of the mesh-patterned resin molded product 10). FIG. 11(b) shows a state where the mesh-patterned resin molded product 10 is stretched in the axial direction, and FIG. 11(c) shows a state where the mesh-patterned resin molded product 10 is squeezed in the axial direction.

Compared to the state before the step is performed, when the step of improving the mobility of the joint portion 13 is performed, it was checked that the stretchability of the mesh-patterned resin tube was improved.

From the comparison between FIG. 11(a) and FIGS. 11(b) and 11(c), it was found that when the step of improving the mobility of the joint portion 13 was performed, deformation in which elastic deformation and plastic deformation were concurrently present occurred in the joint portions 13. Accordingly, the joint portions 13 were partially stretched (plastic-deformed) in a state where the joint portions 13 in their entirety were still connected to each other (without entailing rupture (detachment) of the joint portion 13) and the stretched part was whitened.

That is, it was ascertained that when the secondary processing in which the joint portion 13 changes in such a manner is performed, the mobility of the joint portion 13 could be improved.

Figure 12:
FIG. 12 is a view for describing an operation of the mesh-patterned resin molded product according to Example 1. In the view.
Figure 12:
Figure 12:
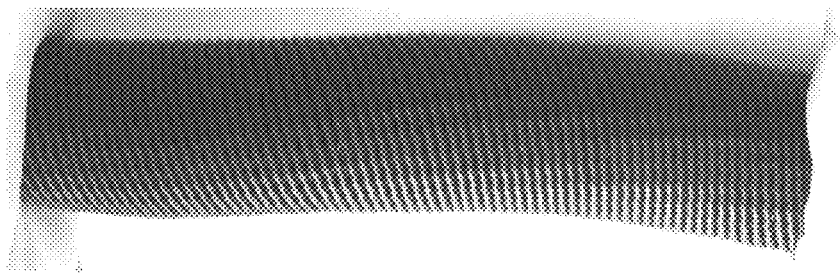

FIG. 12 is a view for describing an operation of the mesh-patterned resin molded product 10 according to Example 1. In the view, FIG. 12(a) shows an ordinary state where no external force is applied to the mesh-patterned resin molded product 10, FIG. 12(b) shows a state where the mesh-patterned resin molded product 10 is stretched in the axial direction thereof, and FIG. 12(c) shows a state where the mesh-patterned resin molded product 10 is squeezed in the axial direction thereof.

From FIG. 12, it is ascertained that the mesh-patterned resin molded product 10 can be very significantly stretched and shrink. Particularly, it is ascertained that the stretching rate between the ordinary state (FIG. 12(a)) and the compressed state (FIG. 12(c)) is very significant.

Example 2

As a mesh-patterned resin molded product 10 according to Example 2, the mesh-patterned resin molded product 10 according to the first embodiment was manufactured. As the molding conditions, polypropylene containing carbon black was used as the resin material. The long-side diameter (the width direction) of each of the first resin wired portion 11 and the second resin wired portion 12 having an elliptical shape was set to 0.7 mm and the short-side diameter (the thickness direction) was set to 0.6 mm. There were provided 14 first resin wired portions 11 and 14 second resin wired portions 12. The pitch between the intersection points (the distance between the intersection points adjacent to each other, that is, the distance between the centers of the joint portions 13 adjacent to each other) in the mesh-patterned structure body 70c (primary product) was set to 5.5 mm in the axial direction of the mesh-patterned resin tube and was set to 5.5 mm in the width direction of the mesh-patterned resin tube. The inner diameter of the mesh-patterned resin tube serving as the mesh-patterned structure body 70c (primary product) was set to 25 mm, and the winding pitch between the first resin wired portion 11 and the second resin wired portion 12 was set to 77.0 mm. The mobility of the joint portion 13 was improved by manually causing the mesh-patterned structure body 70c after being molded to be stretched and shrink in the axial direction, thereby obtaining the mesh-patterned resin molded product 10 according to Example 2.

At the intersection portion between the first resin wired portion 11 and the second resin wired portion 12 in the obtained mesh-patterned resin molded product 10, a direction passing through both the axial centers of the first resin wired portion 11 and the second resin wired portion 12 and being orthogonal to both the axial centers was set to an orthographic projection direction. In a case where the first resin wired portion 11 and the second resin wired portion 12 were viewed in the orthographic projection direction, the ratio of the surface area B (the second surface area) of the joint portion between the first resin wired portion 11 and the second resin wired portion 12 to the overlapping surface area A (the first surface area) between the first resin wired portion 11 and the second resin wired portion 12, that is, the value of B/A was 0.38.

Figure 13:
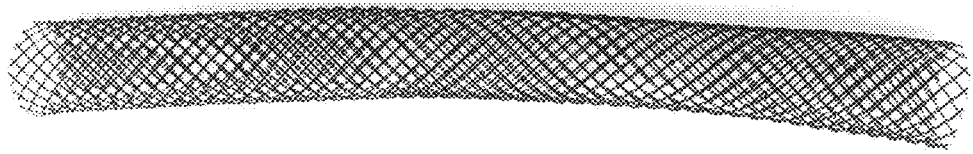
FIG. 13 is a view for describing an operation of a mesh-patterned resin molded product according to Example 2. In the view.
Figure 13:
Figure 13:
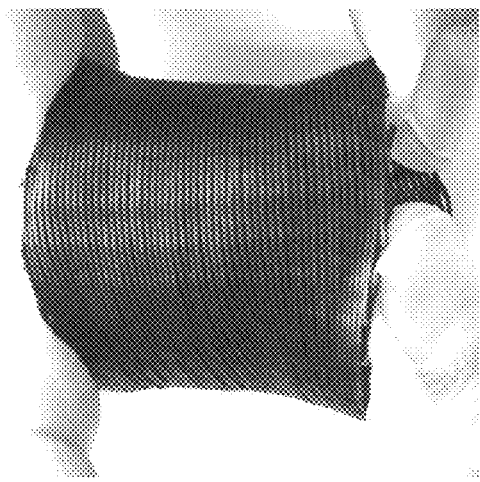

FIG. 13 is a view for describing an operation of a mesh-patterned resin molded product 10 according to Example 2. In the view, FIG. 13(a) shows an ordinary state where no external force is applied to the mesh-patterned resin molded product 10, FIG. 13(b) shows a state where the mesh-patterned resin molded product 10 is stretched in the axial direction thereof, and FIG. 13(c) shows a state where the mesh-patterned resin molded product 10 is squeezed in the axial direction thereof.

From FIG. 13, it is ascertained that the mesh-patterned resin molded product 10 can be more significantly stretched and shrink than that in Example 1. Particularly, it is ascertained that the stretching rate between the ordinary state (FIG. 13(a)) and the compressed state (FIG. 13(c)) is very significant.

FIG. 14 is a view showing a measurement result of stretching rates of the mesh-patterned resin molded products 10 according to Examples 1 and 2.

In Example 1, the lengths of the mesh-patterned resin molded product 10 (the length of the mesh-patterned resin tube in the axial direction) when stretched (FIG. 12(b)), when in the ordinary state (FIG. 12(a)), and when squeezed (FIG. 12(c)) were respectively 520 mm, 481 mm, and 130 mm. That is, the maximum stretching rate (the length when stretched/the length when squeezed) was 4.00.

Meanwhile, in Example 2, the lengths of the mesh-patterned resin molded product 10 when stretched (FIG. 13(b)), when in the ordinary state (FIG. 13(a)), and when squeezed (FIG. 13(c)) were respectively 413 mm, 270 mm, and 40 mm. That is, the maximum stretching rate was 10.33 which was a very significant value.

In addition, in Example 1, the outer diameters of the mesh-patterned resin molded product 10 (the outer diameters of the mesh-patterned resin tube) when stretched (FIG. 12(b)), when in the ordinary state (FIG. 12(a)), and when squeezed (FIG. 12(c)) were respectively 11 mm, 16.5 mm, and 31.5 mm. That is, the maximum stretching rate of the outer diameter (the outer diameter when squeezed/the outer diameter when stretched) was 2.86.

Meanwhile, in Example 2, the folded width (the outer diameter) of the mesh-patterned resin molded product 10 (the long-side diameter of the mesh-patterned resin tube) when stretched (FIG. 13(b)), when in the ordinary state (FIG. 13(a)), and when squeezed (FIG. 13(c)) were respectively 8 mm, 38 mm, and 52 mm. That is, the maximum stretching rate of (the folded width when squeezed/the folded width when stretched) was 6.50.

Comparative Example

As Comparative Example, the mesh-patterned resin tube was produced through inflation molding with the same material and under the same molding conditions as those in Example 1. However, in the mesh-patterned resin tube, the rigidity of the joint portion was significant, and the stretchability was not manifested.

Priority is claimed on Japanese Patent Application No. 2015-031021, filed on Feb. 19, 2015, the entire content of which is incorporated herein by reference.

The invention claimed is:

1. A mesh-patterned resin molded product used for encasing and protecting a hollow piping member provided in a vehicle or a small ship, the mesh-patterned resin molded product, in a case of an ordinary state where no load is applied to the mesh-patterned resin molded product, comprising:
    a plurality of first resin wired portions that extend parallel to each other; and
    a plurality of second resin wired portions that extend parallel to each other in a direction respectively intersecting the first resin wired portions,
    wherein each of the first resin wired portions and each of the second resin wired portions are joined to each other on a joint portion positioned at a mutual intersection portion,
    wherein in a case where a direction passing through both axial centers of the first resin wired portion and the second resin wired portion and being orthogonal to both of the axial centers is set as an orthographic projection direction at the intersection portion between the first resin wired portion and the second resin wired portion which are joined to each other, when the first resin wired portion and the second resin wired portion are viewed in the orthographic projection direction, a second surface area that is a surface area of the joint portion between the first resin wired portion and the second resin wired portion is smaller than a first surface area that is an overlapping surface area between the first resin wired portion and the second resin wired portion,
    wherein the plurality of first resin wired portions and the plurality of second resin wired portions are formed of a material including a thermoplastic resin, and
    wherein the joint portion is partially stretched or partially ruptured.

2. The mesh-patterned resin molded product according to claim 1,
wherein the second surface area is equal to or less than ¾ of the first surface area.

3. The mesh-patterned resin molded product according to claim 1,
wherein when the hollow piping member is encased in the mesh-patterned resin molded product, the mesh-patterned resin molded product is in tight contact with the hollow piping member.

4. The mesh-patterned resin molded product according to claim 1,
wherein the thermoplastic resin includes any one or more selected from the group consisting of polyethylene, polypropylene, nylon, and polyethylene terephthalate.

5. A mesh-patterned resin molded product used for encasing and protecting a hollow piping member provided in a vehicle or a small ship, the mesh-patterned resin molded product, in a case of an ordinary state where no load is applied to the mesh-patterned resin molded product, comprising:
a plurality of first resin wired portions that extend parallel to each other; and
a plurality of second resin wired portions that extend parallel to each other in a direction respectively intersecting the first resin wired portions,
wherein each of the first resin wired portions and each of the second resin wired portions are joined to each other on a joint portion positioned at a mutual intersection portion,
wherein in a case where a direction passing through both axial centers of the first resin wired portion and the second resin wired portion and being orthogonal to both of the axial centers is set as an orthographic projection direction at the intersection portion between the first resin wired portion and the second resin wired portion which are joined to each other, when the first resin wired portion and the second resin wired portion are viewed in the orthographic projection direction, a second surface area that is a surface area of the joint portion between the first resin wired portion and the second resin wired portion is smaller than a first surface area that is an overlapping surface area between the first resin wired portion and the second resin wired portion,
wherein the plurality of first resin wired portions and the plurality of second resin wired portions are formed of a material including a thermoplastic resin, and
wherein the material contains carbon black which imparts stretchability to the mesh-patterned resin molded product.

6. The mesh-patterned resin molded product according to claim 1,
wherein the vehicle is an automobile.

7. The mesh-patterned resin molded product according to claim 1,
wherein the plurality of first resin wired portions are spirally wound so as to be coaxial to each other, and
wherein the plurality of second resin wired portions are spirally wound so as to be coaxial to each other and to rotate opposite to the plurality of first resin wired portions, on an outer circumferential side of the plurality of first resin wired portions.

8. The mesh-patterned resin molded product according to claim 1,
wherein when the mesh-patterned resin molded product is stretched in an axial direction, the mesh-patterned resin molded product reduces in diameter, and
wherein when the mesh-patterned resin molded product is stretched in a radial direction, the mesh-patterned resin molded product increases in diameter.

9. The mesh-patterned resin molded product according to claim 5,
wherein the second surface area is equal to or less than ¾ of the first surface area.

10. The mesh-patterned resin molded product according to claim 5,
wherein when the hollow piping member is encased in the mesh-patterned resin molded product, the mesh-patterned resin molded product is in tight contact with the hollow piping member.

11. The mesh-patterned resin molded product according to claim 5,
wherein the thermoplastic resin includes any one or more selected from the group consisting of polyethylene, polypropylene, nylon, and polyethylene terephthalate.

12. The mesh-patterned resin molded product according to claim 5,
wherein the vehicle is an automobile.

13. The mesh-patterned resin molded product according to claim 5,
wherein the plurality of first resin wired portions are spirally wound so as to be coaxial to each other, and
wherein the plurality of second resin wired portions are spirally wound so as to be coaxial to each other and to rotate opposite to the plurality of first resin wired portions, on an outer circumferential side of the plurality of first resin wired portions.

14. The mesh-patterned resin molded product according to claim 5,
wherein when the mesh-patterned resin molded product is stretched in an axial direction, the mesh-patterned resin molded product reduces in diameter, and
wherein when the mesh-patterned resin molded product is stretched in a radial direction, the mesh-patterned resin molded product increases in diameter.

* * * * *